United States Patent
Mizutani et al.

(10) Patent No.: US 7,620,325 B2
(45) Date of Patent: Nov. 17, 2009

(54) TRANSMISSION APPARATUS WITH FUNCTION OF MULTI-STEP BANDWIDTH ASSIGNMENT TO OTHER COMMUNICATION APPARATUSES

(75) Inventors: Masahiko Mizutani, Kokubunji (JP);
Yoshihiro Ashi, Yokohama (JP);
Masayuki Takase, Kokubunji (JP);
Kenichi Sakamoto, Kokubunji (JP);
Atsushi Iwamura, Yokohama (JP);
Tohru Kazawa, Kokubunji (JP);
Norihiro Sakamoto, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 531 days.

(21) Appl. No.: 11/340,524

(22) Filed: Jan. 27, 2006

(65) Prior Publication Data
US 2007/0064731 A1    Mar. 22, 2007

(30) Foreign Application Priority Data
Sep. 6, 2005   (JP)   ............................. 2005-257905

(51) Int. Cl.
*H04J 14/08* (2006.01)
(52) U.S. Cl. .................... 398/100; 398/66; 398/67; 398/98; 398/76; 370/395.4; 370/468
(58) Field of Classification Search ............... 398/43, 398/52, 58–75, 98–101, 168; 370/230, 235, 370/395, 395.4, 468
See application file for complete search history.

(56) References Cited

U.S. PATENT DOCUMENTS 5,570,355 A    10/1996    Dail et al.

(Continued)

FOREIGN PATENT DOCUMENTS

JP    59-75730    10/1982

(Continued)

OTHER PUBLICATIONS

ITU-T G.984.3 (Feb. 2004): "Gigabit-capable Passive Optical Networks (G-PON): Transmission convergence layer specification", Feb. 2004, pp. 18-40.*

(Continued)

*Primary Examiner*—Ken N Vanderpuye
*Assistant Examiner*—Li Liu
(74) *Attorney, Agent, or Firm*—Stites & Harbison PLLC; Juan Carlos A. Marquez, Esq.

(57) ABSTRACT

A transmission apparatus for use in fixed bandwidth communications and variable bandwidth communications. The transmission apparatus has a memory unit, which stores information contained in a frame and indicating the amount of data to be transmitted from a terminal device, a computing unit, which calculates a bandwidth amount to be assigned to the terminal device based on the data amount, and a transmission unit, which sends the calculated assigned bandwidth amount to the terminal device. The transmission apparatus is characterized in that the computing unit calculates bandwidth amounts to be assigned to different types of flow of which different transmission qualities are requested according to a priority level that is set to each flow type. The transmission apparatus is also characterized in that bandwidth is controlled by designating, instead of a necessary bandwidth amount, transmission starting timing and transmission ending timing, particularly for fixed bandwidth communication data.

3 Claims, 18 Drawing Sheets

U.S. PATENT DOCUMENTS

| | | | |
|---|---|---|---|
| 2001/0028631 A1* | 10/2001 | Iwamura et al. | 370/230 |
| 2001/0028633 A1 | 10/2001 | Shimada et al. | |
| 2004/0095884 A1* | 5/2004 | Lee et al. | 370/235 |
| 2004/0109689 A1* | 6/2004 | Song et al. | 398/69 |
| 2004/0141759 A1* | 7/2004 | Stiscia et al. | 398/168 |
| 2005/0152697 A1* | 7/2005 | Lee et al. | 398/75 |
| 2006/0153564 A1* | 7/2006 | Ryu et al. | 398/69 |
| 2007/0041384 A1* | 2/2007 | Das et al. | 370/395.4 |

FOREIGN PATENT DOCUMENTS

| | | |
|---|---|---|
| JP | 8-251237 | 11/1995 |
| JP | 11-69431 | 8/1997 |
| JP | 2001-251331 | 3/2000 |
| JP | 2002-141909 | 10/2000 |
| JP | 2003-51826 | 8/2001 |
| JP | 2004-528784 | 11/2001 |
| JP | 2004-187302 | 12/2003 |
| WO | WO 02/097476 A2 | 12/2002 |

OTHER PUBLICATIONS

ITU-T Rec. G.984.3 (Feb. 2004), with reference to GTC TC Media Access Control Concept, pp. 18-40.

* cited by examiner

FIG.8A

| BANDWIDTH MANAGEMENT ID (801) | BANDWIDTH (802) | STARTING POSITION OF THE TIMESLOT (803) |
|---|---|---|
| Alloc-ID #1 | 20kB | 0kB |
| Alloc-ID #2 | 50kB | 100kB |
|  |  |  |
| Alloc-ID #n | 10kB | 15000kB |

FIG.8B

| BANDWIDTH MANAGEMENT ID (801) | STARTING POSITION OF THE TIMESLOT (803) | END POSITION OF THE BANDWIDTH (804) |
|---|---|---|
| Alloc-ID #1 | 0kB | 20kB |
| Alloc-ID #2 | 100kB | 150kB |
|  |  |  |
| Alloc-ID #n | 15000kB | 15010kB |

FIG.9

| BANDWIDTH MANAGEMENT ID | BANDWIDTH | |
|---|---|---|
| Alloc-ID #v1 | 2000kB | |
| Alloc-ID #v2 | 10000kB | |
| ...... | | |
| Alloc-ID #vn | 5000kB | |

FIG.10

| BANDWIDTH MANAGEMENT ID | BANDWIDTH | REMAINING BANDWIDTH TO BE ASSIGNED | LIMITATION OF BANDWIDTH ASSIGNED IN EACH READOUT PROCESS | |
|---|---|---|---|---|
| Alloc-ID #v1 | 2000kB | 0kB | 2000kB | |
| Alloc-ID #v2 | 10000kB | 1000kB | 3000kB | |
| ...... | | | | |
| Alloc-ID #vn | 5000kB | 5000kB | 2000kB | |

FIG.11

| ID | STORED AMOUNT OF DATA IN QUEUE | CONTROL TECHNIQUES | |
|---|---|---|---|
| Alloc-ID #1 | 3000kB | FIXED | |
| Alloc-ID #2 | 7000kB | VARIABLE | |
| | ...... | | |
| Alloc-ID #n | 3000kB | FIXED | |

| | BANDWIDTH MANAGEMENT ID (1701) | QUEUE ID (1702) | AMOUNT OF DATA IN QUEUE (1703) | CONTROL TECHNIQUES (1704) | (1705) |
|---|---|---|---|---|---|
| FIXED BANDWIDTH | Alloc-ID #i | 1 | L_1(i) | Fix | |
| | ..... | . | | | |
| | Alloc-ID #i | N1(i) | L_N1(i) | Fix | |
| VARIABLE BANDWIDTH | Alloc-ID #i-n(i) | 1 | L_n(i) | Best effort | |
| | ..... | . | | | |
| | Alloc-ID #i-n(i) | Nn(i) | L_Nn(i) | Best effort | |

FIG. 17B

QUEUE STATUS IN ONU#1(FIG.16)

| BANDWIDTH MANAGEMENT ID | AMOUNT OF DATA IN QUEUE | CONTROL TECHNIQUES |
|---|---|---|
| Alloc-ID #f1 | L_f1 | Fix |
| Alloc-ID #v1 | L_v1 | Best effort |
| Alloc-ID #v2 | L_v2 | Best effort |

FIG. 17C

QUEUE STATUS IN ONU#2(FIG.16)

| BANDWIDTH MANAGEMENT ID | AMOUNT OF DATA IN QUEUE | CONTROL TECHNIQUES |
|---|---|---|
| Alloc-ID #f2 | L_f2 | Fix |
| Alloc-ID #v3 | L_v3 | Best effort |

FIG. 17D

QUEUE STATUS IN ONU#3(FIG.16)

| BANDWIDTH MANAGEMENT ID | AMOUNT OF DATA IN QUEUE | CONTROL TECHNIQUES |
|---|---|---|
| Alloc-ID #f3 | L_f3 | Fix |
| Alloc-ID #v4 | L_v4 | Best effort |

FIG. 18A

| BANDWIDTH MANAGEMENT ID | BANDWIDTH ASSIGNED | START POSITION OF ASSIGNED TIMESLOT |
|---|---|---|
| Alloc-ID #f1 | fix | BWst_f1 |
| Alloc-ID #f2 | fix | BWst_f2 |
| Alloc-ID #f3 | fix | BWst_f3 |

FIG. 18B

| BANDWIDTH MANAGEMENT ID | BANDWIDTH ASSIGNED |
|---|---|
| Alloc-ID #v1 | BW_v1 |
| Alloc-ID #v2 | BW_v2 |
| Alloc-ID #v3 | BW_v3 |
| Alloc-ID #v4 | BW_v4 |

FIG.19A

QUEUE STATUS IN ONU#1(FIG.16)

| BANDWIDTH MANAGEMENT ID | AMOUNT OF DATA IN QUEUE | CONTROL TECHNIQUES |
|---|---|---|
| Alloc-ID #f1 | L_f1 | Fix |
| Alloc-ID #v1 | L_v1 +I_v1 -BW_v1 | Best effort |
| Alloc-ID #v2 | L_v2 +I_v2 -BW_v2 | Best effort |

FIG.19B

QUEUE STATUS IN ONU#2(FIG.16)

| BANDWIDTH MANAGEMENT ID | AMOUNT OF DATA IN QUEUE | CONTROL TECHNIQUES |
|---|---|---|
| Alloc-ID #f2 | L_f2 | Fix |
| Alloc-ID #v3 | L_v3 +I_v3 -BW_v3 | Best effort |

FIG.19C

QUEUE STATUS IN ONU#3(FIG.16)

| BANDWIDTH MANAGEMENT ID | AMOUNT OF DATA IN QUEUE | CONTROL TECHNIQUES |
|---|---|---|
| Alloc-ID #f3 | L_f3 | Fix |
| Alloc-ID #v4 | L_v4 +I_v3 -BW_v3 | Best effort |

TRANSMISSION APPARATUS WITH FUNCTION OF MULTI-STEP BANDWIDTH ASSIGNMENT TO OTHER COMMUNICATION APPARATUSES

CLAIM OF PRIORITY

The present application claims priority from Japanese patent application P2005-257905 filed on Sep. 6, 2005, the content of which is hereby incorporated by reference into this application.

BACKGROUND OF THE INVENTION

This invention relates to a transmission apparatus that sends and receives data divided into frames or packets, and more particularly to a bandwidth director used in a transmission apparatus that is connected physically or logically to plural terminal devices and houses multiplexed connections with the terminal devices to control the amount of data transmitted to the individual terminal devices. More specifically, this invention relates to a line termination device that is a subscriber line termination device for providing a connection line from a user's house, an office building, or a housing complex to a carrier's central office housing user lines, and that employs wavelength-division multiplexing or time-division multiplexing to multiplex data sent from a user terminal over an optical cable as an access line and to dynamically control which bandwidth is assigned according to a user's data transmission request.

The shift from xDSL to FTTH has increased the transmission capacity of an access line and led to diversification of information services provided over networks. Reasons behind this are an ever increasing density of data-based traffic such as Web browsing and downloading and a heightened demand for real-time traffic control in IP telephone services and the like.

The influence of service diversification is more prominent in an access line and an access network which are closer to user terminals than in a core network. In access-based infrastructure services, more complicated QoS control than ever is required depending on contracts made with users and the type of service. The QoS function determines for each packet a processing priority level in a packet network such that data that needs to be processed real-time more than other data is given a high priority level. However, priority levels that can be set in priority control are limited and it is difficult to process real-time packets always at a constant rate.

In other words, real-time data needs to be sent always at a constant rate (by sending a fixed amount of real-time data at a fixed timing) as in conventional telephone networks and in synchronous multiplexing communication networks using SDH (Synchronous Digital Hierarchy). This transmission control ensures stable communication quality and network management reliability in synchronous multiplexing communication networks. With QoS control, however, it is difficult to achieve this transmission control.

As has been described, service diversification has necessitated access network traffic control conditions which are classified roughly into two, one being strict communication timing control and the other being on-demand securing of a broad band. With the present access environment being a hybrid type that places an SDH network and an IP network both on the WAN side in a carrier's central office, this bipolar access-based traffic has to be multiplexed on an access line in order to improve the service quality of an access-based infrastructure. On the other hand, GE-PON (Gigabit Ethernet Passive Optical Network) is being put into practical use in concert with desynchronization of networks (proliferation of IP networks). IP networks and existing infrastructures, which are currently used in combination, are expected to be integrated into a next-generation network centered around a packet network. The compatibility with existing synchronous networks is an indispensable function to deal with this transition from synchronous networks and to provide wide area connection services during the network transition period.

Popularization of data communications has prompted standardization of GE-PON, which uses variable-length packets in an access network, and GE-PON is being introduced in more and more applications. Recently, there has been a large movement to replace conventional landline telephone services with those using IP networks (so-called IP telephones), and development of access networks based on Ethernet is progressing steadily. Ethernet is predicted to be a main technology for future access network development because of its ease of handling.

However, compared to conventional SDH networks, Ethernet is lacking in terms of network management functions. In addition, being a thoroughly best-effort packet communication network, Ethernet is easy to install at the expense of having difficulties in guaranteeing communication reliability. In near future where further service diversification makes networks indispensable information infrastructures, the demand for safety and security of communications as well as communication reliability is expected to increase. Until the reliability and safety of asynchronous communication networks are guaranteed, business activities in particular will continue to need synchronous communication networks which have conventionally been used in dedicated-line services and the like.

Following this trend, G-PON (Gigabit Passive Optical Network) systems, which are regulated by ITU-T G.984, too, are demanded to contain both fixed bandwidth communication data (synchronous multiplexing frames) over E1 or T1 lines which have conventionally been used in dedicated-line services and variable bandwidth data (asynchronous variable-length frames) of Ethernet which is used in data services. It is important in this type of multiplexing to ensure the quality of fixed bandwidth communications (used for voice communications or the like).

SUMMARY OF THE INVENTION

This invention therefore provides a bandwidth management method for recognizing two traffic characteristics, fixed/variable bandwidth data communications, and performing stepped time scheduling.

It should be noted that this invention is not limited to PON system applications but is also applicable to bandwidth controllers and dynamic bandwidth controlling methods in general systems that employ time-division multiplexing for communications.

At present, traffic over networks can roughly be divided into a real-time type in which a transmission time slot (transmission timing) is fixed and a best-effort type in which a transmission time slot is varied depending on the communication amount. An OLT (Optical Line Terminal) of a B-PON (Broadband Passive Optical Network), for example, puts one bandwidth configuration table in a bandwidth controller to treat fixed bandwidth data and variable bandwidth data the same as a conventional way to control bandwidth in paths of packet communications using variable-length data.

Variable bandwidth data requires periodic calculation of which bandwidth is to be assigned for dynamic assignment.

In the case where a single bandwidth configuration table handles fixed bandwidth data and variable bandwidth data, variable bandwidth data affects fixed bandwidth data, which makes it difficult to assign a bandwidth to fixed bandwidth data dynamically and results in unstable CBR (Constant Bit Rate) communications where the bit rate is constant. Specifically, treating every traffic the same means that the utilization state of variable bandwidth is checked not only in variable bandwidth assignment but also in fixed bandwidth assignment and there is a possibility that a resource secured or to be secured for fixed bandwidth data is erroneously used for transmission of other data when fixed bandwidth data and variable bandwidth data are mixed. It is therefore difficult in TDMA (Time Division Multiplexing Access) to guarantee a constant bandwidth for traffic of fixed bandwidth data while controlling variable bandwidth data and fixed bandwidth data in the same way. This varies the packet arrival time interval of fixed bandwidth data, resulting in jitters. Furthermore, employing the same method and frequency as variable bandwidth data in bandwidth setting to calculate a bandwidth assignment amount for fixed bandwidth data, which is communicated in a constant bandwidth and regular communication cycles, can lower the processing efficiency.

Packet communications using variable-length data like Ethernet are incapable of sending a constant amount of data in regular cycles and cannot prevent jitters, ATM, too, is not completely free of jitters. To avoid jitters, a mechanism is necessary which keeps the cell arrival time interval constant during a fixed communication session. Periodic communication control is indispensable for prevention of jitters, and it is a method that has been employed in conventional SDH. This invention proposes a dynamic bandwidth assignment method that is a TDMA-based, periodic, bandwidth control without the risk of lowering the bandwidth utilization efficiency in asynchronous communications and that makes the most of characteristics of variable-length frames used in asynchronous communications.

It is an object of this invention to provide a communication technique for keeping the delay constant in order to support telephone communications and real-time data communications in a network where various types of network service traffic of which different qualities are requested are mixed.

A bandwidth controller according to this invention is used in a communication network that contains both fixed bandwidth communications where a transmission bandwidth is guaranteed and variable bandwidth communications where a transmission bandwidth is not guaranteed and, more generically, a communication network that contains plural traffic types having different bandwidth control requirements and bandwidth assignment priority levels, and is comprised of a bandwidth control unit, which periodically assigns a bandwidth for fixed bandwidth communications and a bandwidth for variable bandwidth communications by TDMA, and which has a function of securing, especially for the fixed bandwidth communications, the same amount of communication bandwidth in every period at the same timing, and a function of assigning a remaining free bandwidth to variable bandwidth communications after fixed bandwidth communications are assigned a bandwidth.

To achieve the control described above, the bandwidth controller prepares a fixed bandwidth configuration table separate from a variable bandwidth configuration table, thus separating control of one type of traffic from control of another and preventing variable bandwidth control from affecting fixed bandwidth control. This also makes it possible to set assignment cycles for fixed bandwidth control and variable bandwidth control individually, and more flexible bandwidth control is attained.

This invention prevents data arrival delay time from fluctuating by preferentially securing fixed transmission timing and transmission bandwidth for data that is requested to be sent in regular cycles (fixed bandwidth data) and thus eliminating fluctuation in time slot position of fixed bandwidth data. This invention also makes full use of bandwidth by dynamically changing the assigned bandwidth size for delayable data (variable bandwidth data). With plural bandwidth configuration tables prepared for each and every one of traffic types, bandwidth assignment can be calculated for one type of traffic separately from another type of traffic and, when plural services having different traffic control requirements are to be multiplexed over an access line or the like, one type of traffic is prevented from affecting another type of traffic, which ensures stable communication quality.

BRIEF DESCRIPTION OF THE DRAWINGS

The present invention can be appreciated by the description which follows in conjunction with the following figures, wherein:

FIGS. 8A and 8B are explanatory diagrams of a fixed bandwidth configuration table according to the embodiment of this invention;

FIG. 9 is an explanatory diagram of a variable bandwidth configuration table according to the embodiment of this invention;

FIG. 10 is an explanatory diagram showing another configuration of the variable bandwidth configuration table according to the embodiment of this invention;

FIG. 11 is an explanatory diagram of bandwidth request information according to the embodiment of this invention;

FIGS. 17A to 17D explanatory diagrams of a queue status management table to manage queues for sending frames upstream according to the embodiment of this invention;

FIGS. 18A and 18B are explanatory diagrams of a fixed bandwidth configuration table according to the embodiment of this invention; and FIGS. 19A to 19C are explanatory diagrams of queue statuses in the respective ONUs after variable bandwidth communication data is sent out according to the embodiment of this invention.

DETAILED DESCRIPTION OF THE PREFERRED EMBODIMENT

This invention relates to a bandwidth assignment method, and is irrespective of whether an optical signal or an electric signal is used as a transmission medium in a physical layer of an OSI reference model. However, this specification describes as the best mode of carrying out this invention a bandwidth assignment method and apparatus in a PON system employed for user access lines.

Figure 1:
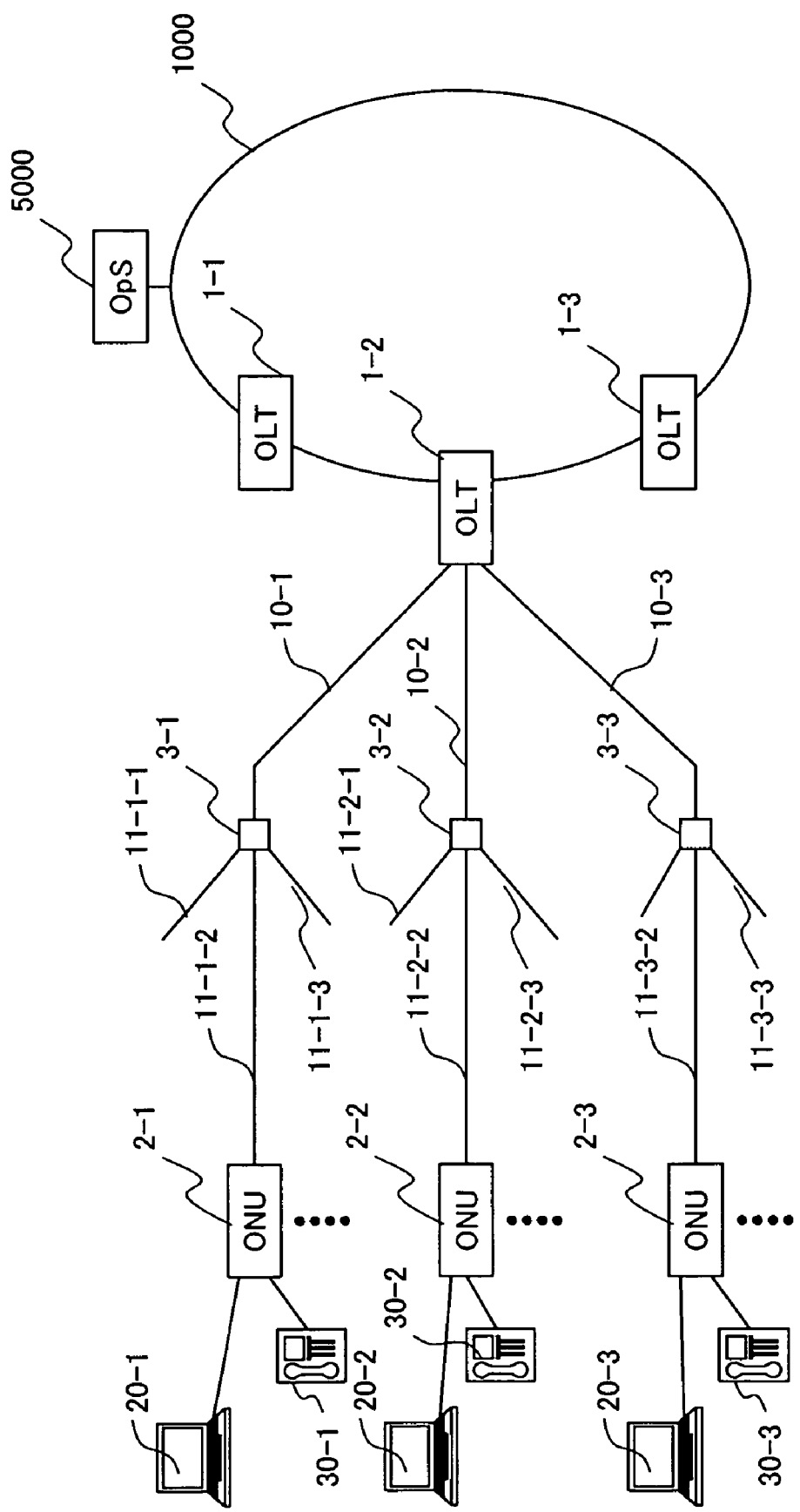
FIG. 1 is a block diagram of a subscriber termination network according to an embodiment of this invention.

FIG. 1 is a block diagram showing a configuration of a subscriber termination network that is built from a PON system as an embodiment of this invention.

Figure 2:
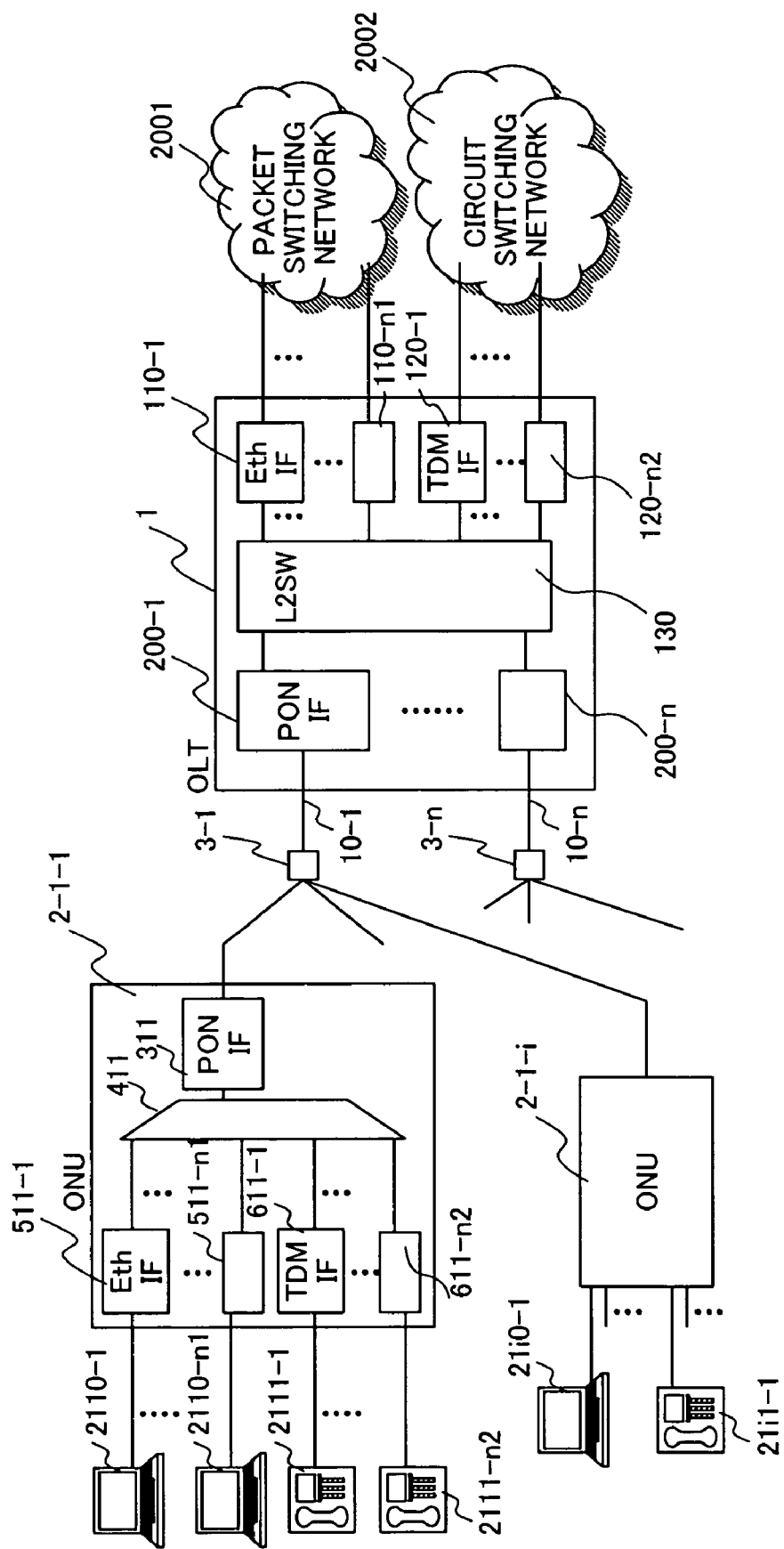
FIG. 2 is a block diagram of an OLT and an ONU, which constitute the network shown in FIG. 1.

This network has Optical Line Terminals (OLTs) 1-1 to 1-3, Optical Network Units (ONUs) 2-1 to 2-3, optical splitters 3-1 to 3-3, and optical fibers 10-1 to 10-3 and 11-1-1 to 11-3-3. The plural OLTs 1-1 to 1-3 are placed at the edge of a network containing user lines, and each OLT houses plural ONUs. The OLTs 1-1 to 1-3 each have plural PON-IFs as shown in FIG. 2. For example, the OLT 1-2 is connected to the ONU 2-1 via the optical fiber 10-1, the splitter 3-1, and the optical fiber 11-1-2. The OLT 1-2 is also connected to the ONU 2-2 via the optical fiber 10-2, the splitter 3-2, and the optical fiber 11-2-2. The OLT 1-2 is further connected to the ONU 2-3 via the optical fiber 10-3, the splitter 3-3, and the optical fiber 11-3-2.

The splitters 3-1 to 3-3 respectively copy signals sent from the OLT 1-2 via the optical fibers 10-1 to 10-3 to the optical fibers 11-1-1 to 11-1-3, 11-2-1 to 11-2-3, and 11-3-1 to 11-3-3, which are branched on the ONU side. The splitters 3-1 to 3-3 respectively transmit, via the shared optical fibers 10-1, 10-2, and 10-3, to the OLT 1-2, upstream signals which are sent from the ONUs to the OLT 1-2 via the optical fibers 11-1-1 to 11-1-3, 11-2-1 to 11-2-3, and 11-3-1 to 11-3-3.

Here, take a look at the optical fiber 10-2. Upstream signals sent from the ONU 2-2 and other ONUs in the OLT 1-2 via the optical fibers 11-2-1 to 11-2-3 are transmitted to the shared optical fiber 10-2 in order consistent with timing at which the signals are received. Transmission over the optical fiber 10-2 employs multiplexing by TDMA in order to avoid overlapping of upstream signals from one ONU with those from another ONU. In communications with the ONUs connected to the optical fibers 10-1 to 10-3, the OLT 1-2 notifies each ONU of transmission timing and a transmissible data amount that can be used in upstream communications. In short, transmission timing is controlled with the use of TDMA which assigns a communication bandwidth to each ONU.

The ONUs 2-1 to 2-3 house subscriber data communication terminals devices 20-1 to 20-3 and Time Division Multiplexing (TDM) terminal devices 30-1 to 30-3, respectively. The subscriber data communication terminals devices 20-1 to 20-3 are personal computers, mobile communication terminals, or the like to receive services that require data transmission efficiency such as browsing of World Wide Web (WWW) information and data downloading. Ethernet can be given as a major connection service. The TDM terminal devices are connected to the ONU's TDM interfaces, which will be described later.

The TDM interfaces enable the ONUs 2-1 to 2-3 to contain synchronous multiplexing frame communications (TDM communications) using T1 lines or E1 lines. This is a communication method in which information is multiplexed by synchronizing communication control between a sender of the information and a receiver of the information. A typical example of the communication method is a telephone service that uses the circuit switching method. Each ONU can house plural data communication terminals and plural TDM terminals.

FIG. 2 illustrates the device configurations of the OLTs 1-1 to 1-3 (collectively referred to as OLT 1 in the following description) and the ONUs 2-1-1 to 2-1-$i$ (collectively referred to as ONU 2 in the following description), which constitute the network shown in FIG. 1, as well as the configuration of the network composed of the OLT 1 and the ONU 2. FIG. 2 is a function block diagram illustrating the flow of subscriber communication data in the PON system.

The OLT 1 has PON interfaces 200-1 to 200-$n$, an layer 2 switch (L2SW) 130, Ethernet interfaces 110-1 to 110-$n$1 and TDM interfaces 120-1 to 120-$n$2. The PON interfaces 200-1 to 200-$n$ terminate optical signals sent through fiber-optic lines. The PON interfaces 200-1 to 200-$n$ perform, upon transmission of data from the OLT 1 to the ONU 2, format conversion between an Ethernet frame or TDM data and data that is used for communication control in a PON section (a section between a PON interface of an OLT and a PON interface of an ONU). Other processes executed by the PON interfaces 200-1 to 200-$n$ include bandwidth control for downstream data communications, assignment of a bandwidth to the ONU for upstream data communications, and two-way conversion between electrical and optical signals.

The L2SW 130 multiplexes signals sent from the Ethernet interface 110 and signals sent from the TDM interface 120, and sends the multiplexed signals to the PON interface 200. The L2SW 130 also breaks up a signal sent from the PON interface 200 and sends the signal pieces to the Ethernet interface 110 or the TDM interface 120.

The Ethernet interface 110 has a data interface and is connected to a packet switching network 2001. The Ethernet interface 110 sends, to the L2SW 130, packets inputted from the packet switching network 2001. The Ethernet interface 110 also receives, from the L2SW 130, data received by the PON interface 200. The packet switching network 2001 is a network that does not require a line to be kept occupied throughout a data transmission session, for example, Ethernet.

The TDM interface 120 has a TDM line interface for E1, T1 or other TDM lines, and is connected to a circuit switching network 2002. The TDM interface 120 sends, to the L2SW 130, packets inputted from the circuit switching network 2002. The TDM interface 120 also receives, from the L2SW 130, data received by the PON interface 200. The circuit switching network 2002 is a network that requires a line to be kept occupied throughout a data transmission session, for example, an SDH network or an ISDN network.

A bandwidth is assigned to each bandwidth management ID in a section between PON interfaces (a PON section). A bandwidth is a data amount in a time slot created by time division. The OLT 1 notifies the ONU 2 of a bandwidth assigned to each bandwidth management ID. The ONU 2 sends data using a bandwidth that is notified by the OLT 1.

The splitter 3 is a branching device set at some point in an optical fiber network and a star coupler, for example, is employed as the splitter 3. The splitter 3 multiplexes signals sent from the plural ONUs 2. Fixed bandwidth data (TDM data) and variable bandwidth data (Ethernet data) are mixed in a section of the same optical fiber between the splitter 3 and the OLT 1.

The ONU 2 informs the OLT 1 about how many packets are accumulated in a transmission queue and requests the OLT 1 to assign a transmission bandwidth. Receiving the packet accumulation status from the ONU 2, the OLT 1 adjusts data transmission timing of the ONU 2 through dynamic bandwidth control using TDMA, and notifies the ONU 2 of transmission timing. The ONU 2 sends packets to the OLT 1 at the timing notified by the OLT 1. In this way, upstream packets are prevented from colliding with each other in a line section between the splitter 3 and the OLT 1.

The ONU 2 is a device to terminate a subscriber-side optical fiber. The ONU 2 has a PON termination unit (PON interface) 311, a layer two signal multiplexing unit (MUX) 411, Ethernet interfaces 511-1 to 511-$n$1 and TDM interfaces 611-1 to 611-$n$2. The ONU 2 is connected to data communication terminals 2110-1 to 2110-$n$1 via the Ethernet interfaces 511, and is connected to TDM terminals 2111-1 to 2111-$n$2 via the TDM interfaces 611. The ONU 2 can have plural Ethernet interfaces 511 and plural TDM interfaces 611 connected thereto. The PON termination unit 311 performs optical-electrical conversion in which optical signals sent from the OLT 1 are converted into electrical signals, format conversion between an Ethernet frame or TDM data and data that is used for communication control in a PON section upon transmission of data to the subscriber side (UNI: User Network Interface) of the ONU 2, bandwidth control for downstream data communications, and generation of upstream transmission frames which follows a transmission timing command of the OLT 1. The MUX (layer two signal multiplexing unit) 411 operates the same way as the L2SW 130 of the OLT 1.

The L2SW 130 receives signals from the PON interfaces 200 and transfers the received signals to the Ethernet interfaces 110 or the TDM interfaces 120 according to signal destination information attached to L2 frames. The L2SW 130 also receives data from the Ethernet interface 110 or the TDM interface 120 and transfers the received data to one of the PON interfaces 200 that is the destination of the data. The PON interfaces 200 multiplex Ethernet data and TDM data. A function similar to this function of the L2SW 130 is given to the ONU 2. In the ONU 2, signals sent from the PON interface 311 are transferred to the Ethernet interfaces 511 or the TDM interfaces 611, and signals sent from the Ethernet interfaces 511 as well as signals sent from the TDM interfaces 611 are transferred to the PON interface 311.

Figure 3:
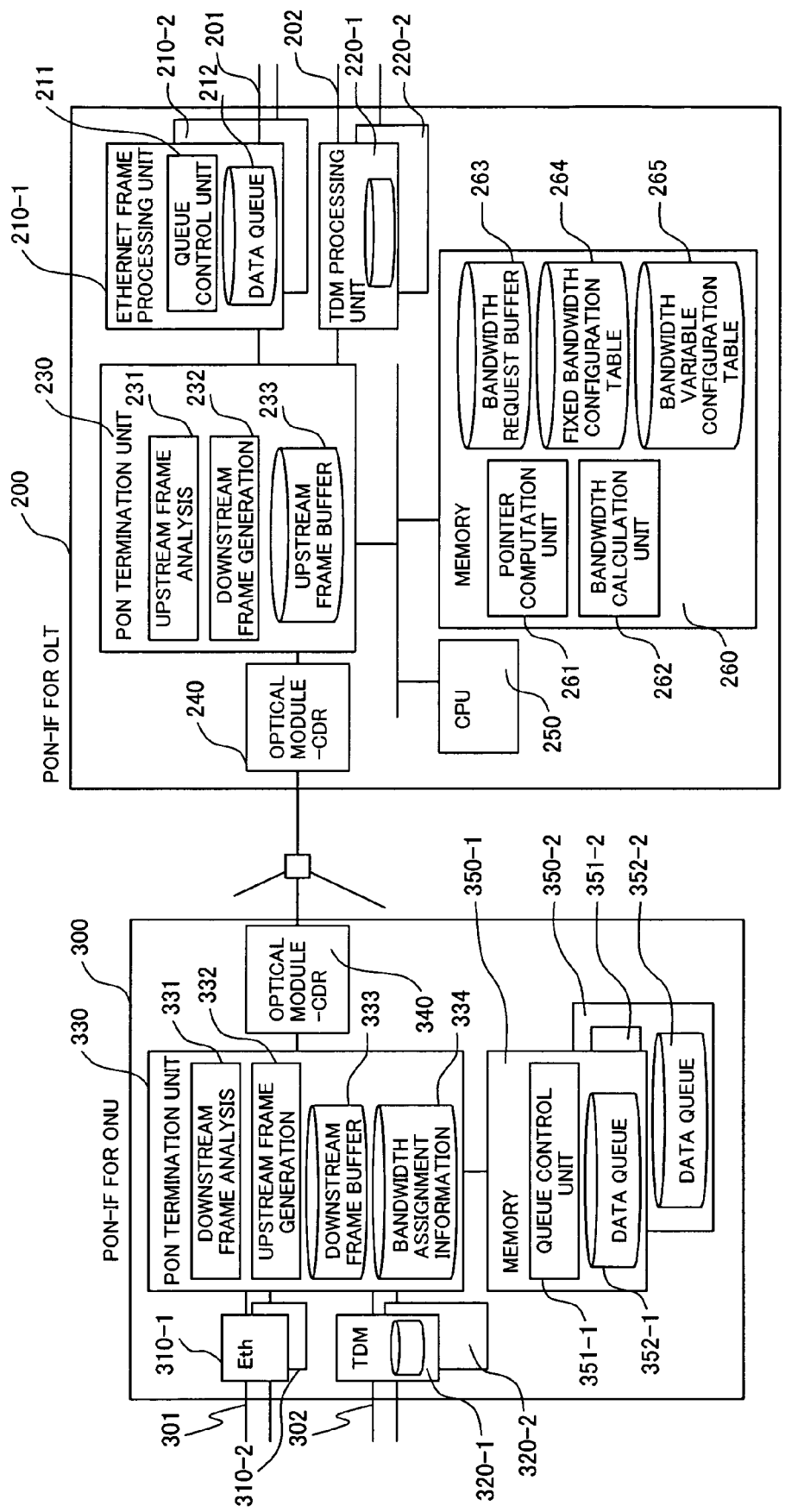
FIG. 3 is a function block of PON interface units shown in FIG. 2.

FIG. 3 shows function blocks of the PON interfaces 200 and 311 in the OLT 1 and the ONU 2 of FIG. 1. The illustration in FIG. 3 focuses on functions related to bandwidth control in a PON section.

The PON interface 200 of the OLT 1 has Ethernet frame processing units 210-1, 210-2, . . . , TDM processing units 220-1, 220-2, . . . , a PON termination unit 230, an optical module 240, a CPU 250 and a memory 260.

The Ethernet frame processing unit 210 processes downstream communications in which data is sent to subscriber terminals, and upstream communications in which data is sent to an access network (SNI: Service Network Interface) that has the Ethernet interface 110 and TDM interface 120 of the OLT 1. The TDM processing unit 220 processes upstream and downstream TDM communications. The PON termination unit 230 links communication control in a PON section to Ethernet or TDM communication control in an external network.

The optical module 240 generates, after downstream frames are generated in the PON termination unit 230, optical signals that are transmitted via optical fibers. The optical module 240 also converts upstream optical signals received via optical fibers into electrical signals, and sends the electrical signals to the PON termination unit 230. The memory 260 stores data management information and programs used for communication control. Other information stored in the memory 260 includes frame analysis results and a bandwidth control state.

Data inputted through SNI side lines 201 is temporarily stored in a data queue 212, which is provided in the Ethernet frame processing unit 210. The stored data is read at a command from a queue control unit 211, and reconstructed into downstream frames for PON section communications by the PON termination unit 230. The queue control unit 211 follows a command of the PON termination unit 230 and reads frames stored in the data queue 212.

A processing module for upstream communications and downstream communications is provided in the TDM processing unit 220 as in the Ethernet frame processing unit 210. Data received through a TDM line 202 is temporarily stored in a buffer of the TDM processing unit 220 and then transferred to the PON termination unit 230 to be reconstructed into downstream frames. Being a transfer method using synchronous multiplexing frames, TDM has a smaller margin for transmission delay than Ethernet, and data received through the TDM line 202 in regular cycles is outputted to the PON termination unit 230 at the same rate as the data reception data. The cycle of sending and receiving data over a TDM line is 125 microseconds in the case of SDH (Synchronized Digital Hierarchy). The 125-microsecond cycle is also employed for control of transmission/reception in a PON section according to G-PON standardization recommendations (see ITU-T Recommendation G. 984).

The PON termination unit 230 generates, from reception data stored in the Ethernet frame processing unit 210 and the TDM processing unit 220, downstream frames which are sent to the PON section (ANI). In the PON section, frames are periodically generated according to communication control using TDMA. G-PON sends and receives downstream frames and upstream frames in a 125-microsecond cycle. This cycle will be called a basic cycle and these frames will be called basic cycle frames in the following description.

Data stored in the Ethernet frame processing unit 210 and the TDM processing unit 220 is reconstructed into the format of the basic cycle frame. In the basic cycle frame, data bound for the plural ONUs 2 (subscribers or subscriber terminals) is multiplexed, and identifiers indicating the destination ONUs 2 are inserted along with the data. The format of the basic cycle frame will be described later.

An upstream frame analysis unit 231 in the PON termination unit 230 determines to which Ethernet port or TDM port an upstream frame is to be transferred. The upstream frame analysis unit 231 extracts a traffic state contained in an upstream frame, namely, how much data waiting to be sent is stored in an upstream frame transmission queue, which is provided in the ONU 2. The extracted information is stored as bandwidth request information 263 in the memory 260, and used in assigning a bandwidth for communications from the OLT 1 to the ONU 2.

Upstream data is sent in a PON section as the OLT 1 gives the ONU 2 a data transmission permission. The ONU 2 follows a transmission schedule set such that transmission data does not overlap after multiplexing in a splitter, and sends out a designated amount of data at designated timing. This enables the OLT 1 to identify the sender of each frame.

The memory 260 has a pointer calculation unit 261 and a bandwidth calculation unit 262. The bandwidth calculation unit 262 calculates a bandwidth to be assigned to each ONU 2 in the next basic cycle based on the bandwidth request information 263 that is extracted from an upstream frame. The bandwidth calculated in this step is stored in a variable bandwidth configuration table 265.

A variable bandwidth is a bandwidth dynamically assigned to traffic of data that is sent and received in Ethernet frames at an arbitrary transmission timing and at a transmission rate varied depending on the network resource utilization state. DBA is a request-based, dynamic, bandwidth assignment method and is applied to variable bandwidth control. The memory 260 stores a fixed bandwidth configuration table 264, which holds a bandwidth amount assigned for synchronous multiplexing communications in a circuit switching network such as a telephone network.

Synchronous multiplexing communications use a constant bandwidth throughout a session and accordingly the amount of bandwidth assigned to an ONU does not change for the duration of the session. However, a change in fixed bandwidth utilization state resulting from a change in count of channels that are set in advance by an OpS (Operations System) as synchronous multiplexing communication lines changes the amount of bandwidth assigned to an ONU. The fixed bandwidth configuration table 264 is consulted by a downstream frame generation unit 232 and bandwidth calculation unit 262 of the PON termination unit 230, and therefore contains a fixed bandwidth utilization state that is set semi-fixedly by the OpS.

The pointer calculation unit 261 in the memory 260 calculates a variable bandwidth transmission schedule for bandwidth assignment by DBA. With this function, a variable bandwidth transmission schedule is calculated when the downstream frame generation unit 232 in the PON termination unit 230 creates in a downstream frame a bandwidth designating field, which will be described later. The pointer calculation unit 261 is necessary in variable bandwidth assignment. Prior to variable bandwidth assignment, a bandwidth for synchronous multiplexing frame communications where the assigned bandwidth size and the transmission timing are fixed (a fixed bandwidth) is assigned based on the fixed bandwidth configuration table 264.

Then an assigned bandwidth amount is read out of the variable bandwidth configuration table 265 for each bandwidth setting unit, and a free bandwidth (free transmission timing, free transmission position) that remains free after a transmission timing assignment process for fixed bandwidth entries and previous variable bandwidth entries is specified for each table entry (bandwidth setting unit). In this process, the pointer calculation unit 261 manages the upstream frame transmission timing assignment state and gives a start pointer, which indicates a free bandwidth in an upstream frame. The pointer calculation unit 261 may give an end pointer if necessary.

The ONU 2 has an optical module 340, which terminates optical fibers, a PON termination unit 330, memories 350-1, 350-2, . . . , Ethernet line termination unit 310-1, 310-2, . . . , which house Ethernet lines 301, and TDM line termination units 320-1, 320-2, . . . , which house TDM lines 302.

The Ethernet line termination unit 310 extracts Ethernet frames from signals that are inputted through the Ethernet lines 301, and sends the extracted frames to the PON termination unit 330. The Ethernet frames extracted by the Ethernet line termination unit 310 are stored in a data queue 352 of the memory 350. The data queue 352 is managed by a queue control unit 351, and is read at a command given by an upstream frame generation unit 332 of the PON termination unit 330 to the memory 350. Ethernet frames reconstructed from downstream frames that are received by the optical module 340 are stored in a data queue (transmission queue) that is provided for downstream Ethernet frames in the data queue 352 of the memory 350. A downstream queue control unit in the queue control unit 351 follows a read command given by the Ethernet line termination unit 310 and sequentially transfers frames out of the data queue to the Ethernet line termination unit 310.

The TDM line termination unit 320 is similar to the TDM line termination unit 220 of the OLT 1 and extracts TDM data which is sent in a constant amount in regular cycles. Information extracted by the TDM termination unit 320 includes TDM data transmission cycle information, user data, and information of a TDM channel used for data in question. Received TDM data is temporarily stored in a buffer, and then read out of the buffer at a constant rate to be transferred to the PON termination unit 330 for generation of upstream frames in the PON termination unit 330.

The ONU 2 places the Ethernet data transmission queue 352 and TDM data transmission queue 352 apart from the line termination units 310 and 320. However, the data queues 352 can be placed in the line termination units 310 and 320 without affecting the operation of the PON-IF 300 as long as spaces for the line termination units 310 and 320 and paths for transferring main signals are secured. The PON-IF 300 is an aggregation of a series of function blocks built on ASIC, and can have any configuration that enables the PON-IF 300 to perform the processing described above.

A downstream frame analysis unit 331 of the PON termination unit 330 extracts Ethernet data and TDM data from downstream PON section communication frames stored in a downstream frame buffer 333, and reconstructs the extracted data into formats that allow the data to be sent out from the line termination units 310 and 320. Reconstructed data frames are processed as described above. The downstream frame analysis unit 331 also extracts device control information and bandwidth assignment information which are sent from the OLT 1.

Device control information is processed by a CPU connected externally or internally to the device. Information on bandwidth assignment to upstream frames (in other words, transmission permission information directed to the individual ONUs 2) is stored in a bandwidth assignment information database 334, which is provided in the PON termination unit 330. The bandwidth assignment information database 334 is consulted by the upstream frame generation unit 332, which, in cooperation with the queue control unit 351, uses an upstream frame transmission data amount (assigned bandwidth size) to control the data read amount in reading the data queue 352.

Bandwidth control in a PON section is divided into control on upstream frames and control on downstream frames. In PON section bandwidth control on downstream frames, the downstream frame generation unit 232 of the PON termination unit 230 changes frames that are inputted to the OLT 1 through the Ethernet interface 110 and the TDM interface 120 into basic cycle frames (125-microsecond cycle frames) for PON section communications. In generation of the frames, the amount of data read out of the data queue 212 in the Ethernet frame processing unit 210 and the data queue in the TDM processing unit 220 is controlled to control the bandwidth.

For instance, the downstream communication bandwidth is controlled by setting a read priority level to each of queues among which data is distributed. In the ONU 2, after the downstream frame analysis unit 331 extracts Ethernet frames and TDM frames from PON section communication frames, the amount of data read out of frames that are stored in the data queues of the line termination units 310 and 320 is controlled to control the bandwidth.

The data queues in the line termination units 310 and 320 can be read in an arbitrarily set order in generation of downstream PON frames. A transmission bandwidth required for TDM data may preferentially be assigned to a frame in order to ensure the quality of TDM communications. Other various data queue reading orders can be set arbitrarily.

Bandwidth control on upstream frames is achieved through control of the amount of data read out of the upstream data queue 352 which is controlled by the upstream frame generation unit 332 in the ONU 2 and control of the amount of data read out of the data queues by the line termination units 210 and 220 in the OLT 1. While in bandwidth control on downstream frames a bandwidth is determined by the type of received data (Ethernet data or TDM data) and by read priority levels set to queues among which the received data is distributed, bandwidth control on upstream frames is conducted upon generation of the frames. The upstream frame generation unit 332 generates frames by reading transmissible data out of the upstream data queue according to a data transmission amount allocated to each upstream frame transmission cycle which is stored in the bandwidth assignment information database 334.

Bandwidth control is performed on each bandwidth assignment unit (Alloc-ID) set to each ONU 2 (one or more bandwidth assignment units are set to one ONU 2). Accordingly, the fixed bandwidth configuration table 264 and the variable bandwidth configuration table 265 have entries sorted by Alloc-ID to show a bandwidth amount assigned to each Alloc-ID.

Downstream and upstream frames are broken into subframes for respective Alloc-IDs, and PON section basic cycle frames are generated by combining (multiplexing) the subframes. In PON section transmission bandwidth control, it is therefore desirable for the PON-IF 200 of the OLT 1 to control the amount of data read out of data queues with Alloc-ID as a unit.

Plural Alloc-IDs to which the same priority level is set may be assigned to one data queue. Similarly, in upstream frame transmission control by the PON-IF 300 of the ONU 2, bandwidth control consistent from frame generation up through frame transmission control is achieved by setting a data queue on an Alloc-ID basis or by sharing a data queue among plural Alloc-IDs that have the same priority level.

Data queues consulted after frame generation may be given the same priority level, so that an actual bandwidth utilization ratio is reflected while preventing DBA calculation from being influenced by other factors.

Figure 4:
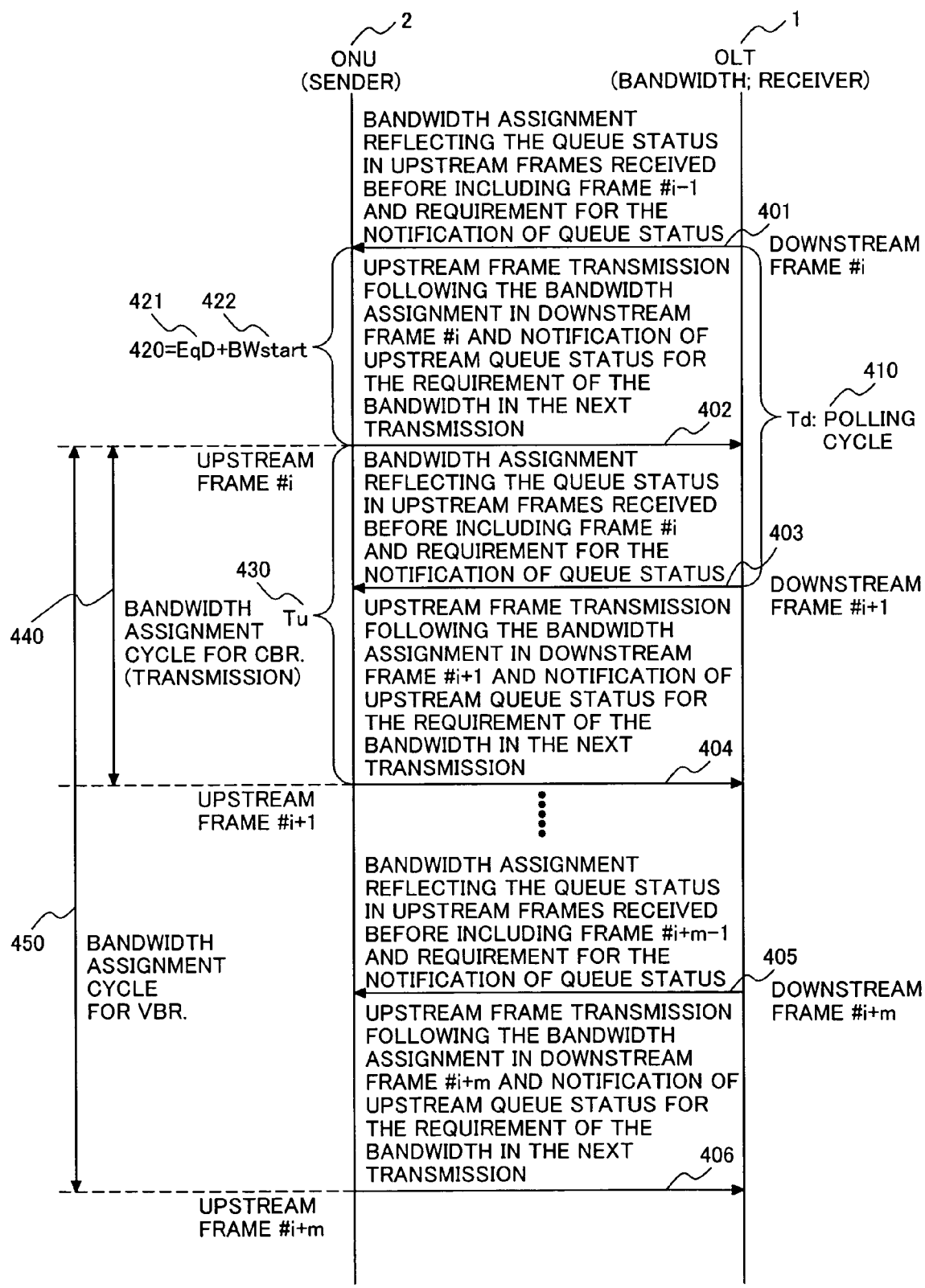
FIG. 4 is a sequence diagram showing DBA's basic operation and control timing according to the embodiment of this invention.

FIG. 4 is a sequence diagram illustrating DBA's basic operation, and a relation between fixed bandwidth control timing and variable bandwidth control timing according to this invention.

The OLT 1 uses a bandwidth designating field of a downstream frame to give its subordinate ONU 2 a transmission bandwidth and transmission timing, which in FIG. 4 correspond to a transmission command 401 in a downstream frame #i. This field is determined based on the amount of data waiting to be transmitted in each ONU 2 which is obtained by the OLT 1 when an upstream frame is processed prior to the downstream frame. The downstream frame may contain, in addition to the transmission command, a queue status notification command given by the OLT 1 to the ONU 2 that is managed by this OLT 1. Although when to notify a queue status depends on the bandwidth assignment cycle of the OLT 1, the OLT 1 receives a queue status notification (transmission bandwidth request) from each ONU 2 at least once in its bandwidth assignment cycle.

When a length of time corresponding to a sum 420 of an Equalization Delay (EqD) 421 and a time period that is counted from the EqD 421 until the start of transmission (BW start) passes since reception of the downstream frame 401, the ONU 2 sends an upstream frame. The EqD 421 is a transmission latency specified in order to multiplex, by TDMA, over optical fibers, upstream frames sent from all of plural subordinate ONUs 2 of the OLT 1. Usually, timing at which frames arrive at the OLT 1 varies from one ONU 2 to another since the ONUs 2 are at different distances from the OLT 1. In order to multiplex upstream frames from the ONUs 2 which are at different distances after the frames pass through splitters (namely, when the frames are received by the OLT 1), the same reference point for arrival timing has to be given to the ONUs 2.

How long it takes from the time the OLT 1 sends a downstream frame until the time the OLT 1 receives an upstream frame in response is measured by measuring the distance from the OLT 1 for each ONU 2, and the time it takes for an upstream frame to arrive from the ONU 2 of the longest delay is employed as an upstream frame arrival time common to all the ONUs 2. A signal processing time obtained for each ONU 2 by subtracting an optical fiber transmission delay, a delay due to optical electrical conversion, and a delay due to electrical optical conversion from the common upstream frame arrival time is stored as the EqD 421 in each ONU 2. The BW start 422 indicates when an ONU in question is to start data transmission, and is a parameter indicating how much time has passed since the upstream frame transmission reference point, which is determined by the EqD 421. This parameter is contained for notification in the frame 401, which is sent from the OLT 1 to the ONU 2, and is expressed in bytes, for example.

In the case where the downstream frame 401 brings along a queue status notification command, the ONU 2 notifies with an upstream frame. 402 the OLT 1 of the amount of data waiting to be transmitted.

Subsequently, the OLT 1 repeats the processing of receiving a queue status notification with an upstream frame and assigning, in the next downstream frame, a bandwidth calculated based on the notified amount of data waiting to be transmitted. In performing this processing for every 125 microseconds, which is the basic cycle in PON, from the view point of the OLT 1, the cycle of controlling a downstream frame and its corresponding upstream frame matches the interval of the EqD 421. The time at which an upstream frame sent in response to each downstream frame arrives at the OLT 1 is delayed by an amount of time corresponding to the sum of a PON section signal transmission time, a processing time required to generate an upstream frame in the ONU 2, and the EqD 421. Accordingly, in a PON section, commands (downstream frames) from plural OLTs 1 are accumulated at some point in time and responses (upstream frames) of the ONUs 2 to the commands are delayed by a constant cycle length.

There is no need to set an equal cycle length to the fixed bandwidth assignment cycle and the variable bandwidth assignment cycle. The fixed bandwidth assignment cycle is dependent on TDM data sampling cycle settings in the TDM processing unit 220 of the PON-IF 200 and the TDM processing unit 320 of the PON-IF 300. Also, not all of TDM communication channels need to be assigned a bandwidth for every 125 microseconds, and it is sufficient if a constant bandwidth is assigned in regular cycles. In short, an integral multiple of the basic cycle, a 125-microsecond cycle, can be set as one fixed bandwidth assignment cycle.

A variable bandwidth is assigned such that overlapping with a fixed bandwidth transmission position assigned to an upstream frame is avoided. As long as this condition is fulfilled by obtaining, in assigning a variable bandwidth, the fixed bandwidth assignment state of its target upstream frame, any length of time can be set as the variable bandwidth assignment cycle.

This is achieved by preparing a fixed bandwidth configuration table and a variable bandwidth configuration table separately and managing bandwidths on lines separately. Assigning a fixed communication bandwidth to a position according to OpS settings makes it possible to avoid jittering. The bandwidth calculation unit handles only variable bandwidth and not fixed bandwidth, which means that the bandwidth calculation unit is not loaded down with practically unnecessary processing such as preferential processing of fixed bandwidth data and calculation of fixed bandwidth data assigning positions. Thus a stable communication quality and efficient processing can be obtained.

FIG. 4 shows bandwidth assignment timing for when a fixed bandwidth assignment cycle 440 is 125 microseconds and a variable bandwidth assignment cycle 450 is m times the 125-microsecond frame (fixed bandwidth assignment cycle 440). In this case, while a fixed communication bandwidth is assigned (transmission permission is given) fixedly for each upstream frame by its preceding downstream frame according to a channel setting state held in the fixed bandwidth configuration table, a transmission bandwidth as a variable communication bandwidth is set only once within the variable bandwidth assignment cycle 450.

To assign a variable communication bandwidth, the amount of data that can be transmitted in a variable bandwidth assignment cycle is calculated from the amount of data waiting to be transmitted which is notified by each ONU 2. A variable bandwidth assignment cycle is the cycle of updating the variable bandwidth configuration table 265. A bandwidth set in the variable bandwidth configuration table 265 is valid through one table update period, and therefore several assignment methods are employable. One of the methods is to assign, for each entry (Alloc-ID) in the variable bandwidth configuration table 265, all available transmission bandwidths as a series of bandwidths (one large bandwidth) in order. Another method is to divide a bandwidth to be assigned to a specific Alloc-ID into plural upstream frames within the update cycle of the variable bandwidth configuration table 265. These methods will be described later.

Figure 5:
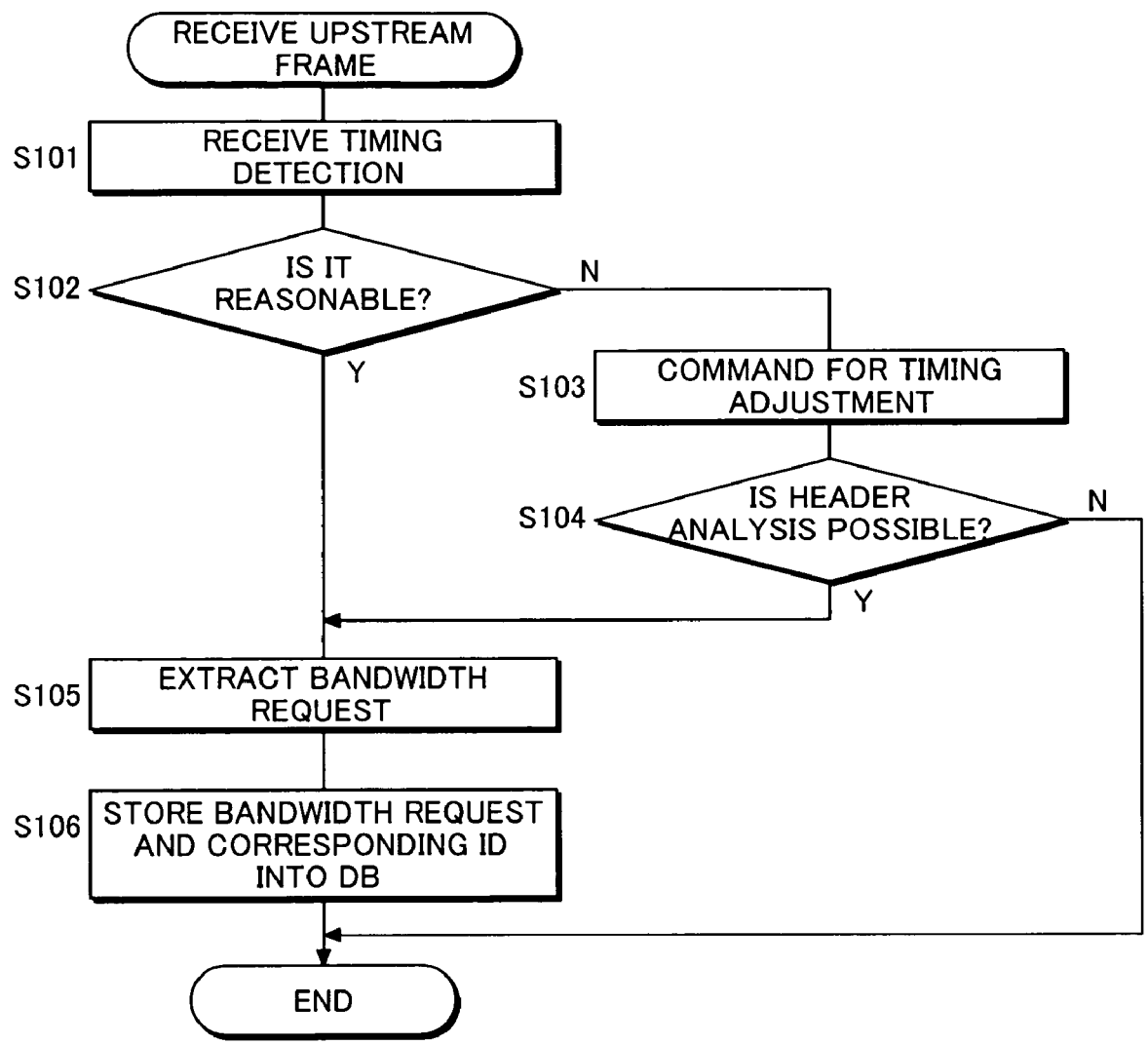
FIG. 5 is a flow chart for an upstream frame receiving process according to the embodiment of this invention.
Figure 6:
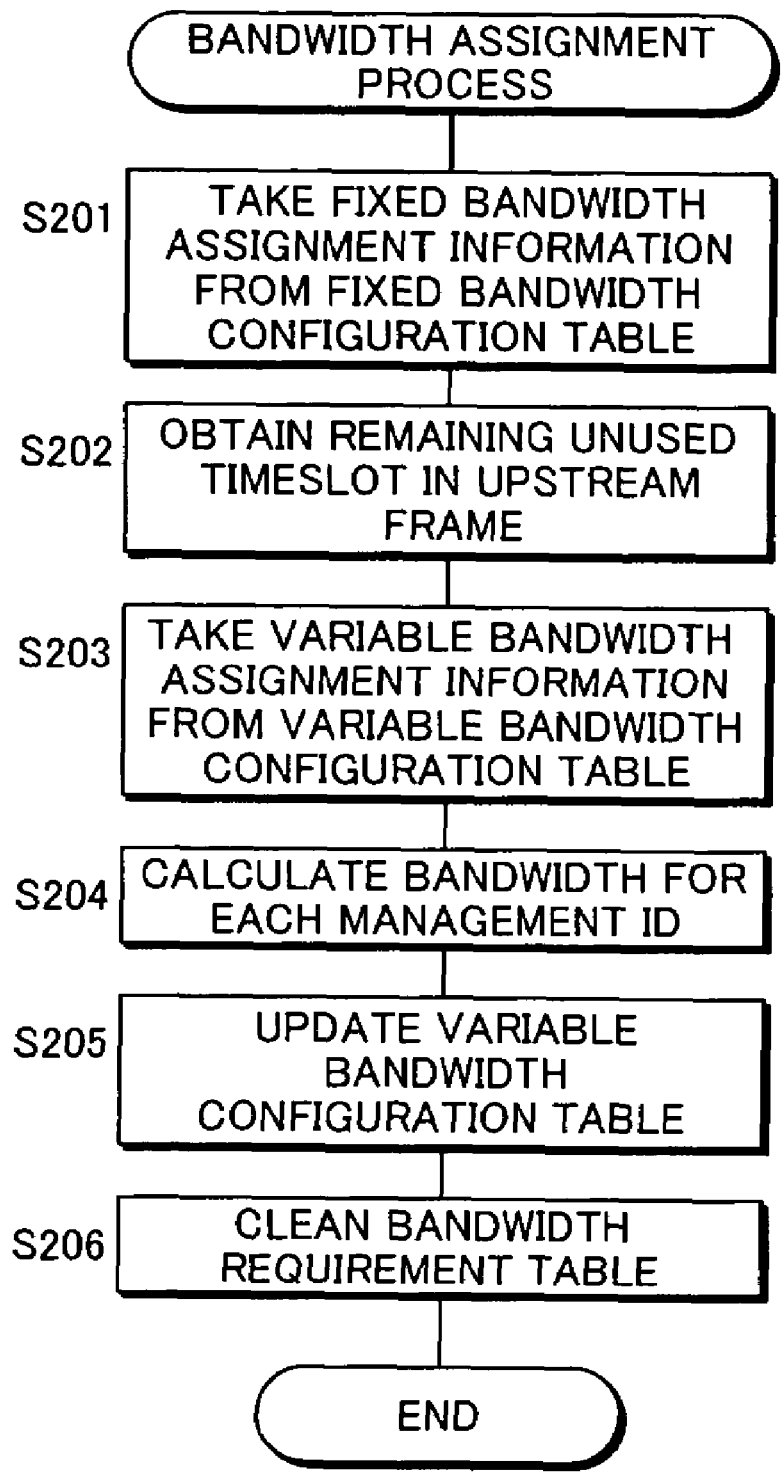
FIG. 6 is a flow chart for a process of setting a variable bandwidth configuration table according to the embodiment of this invention.
Figure 7:
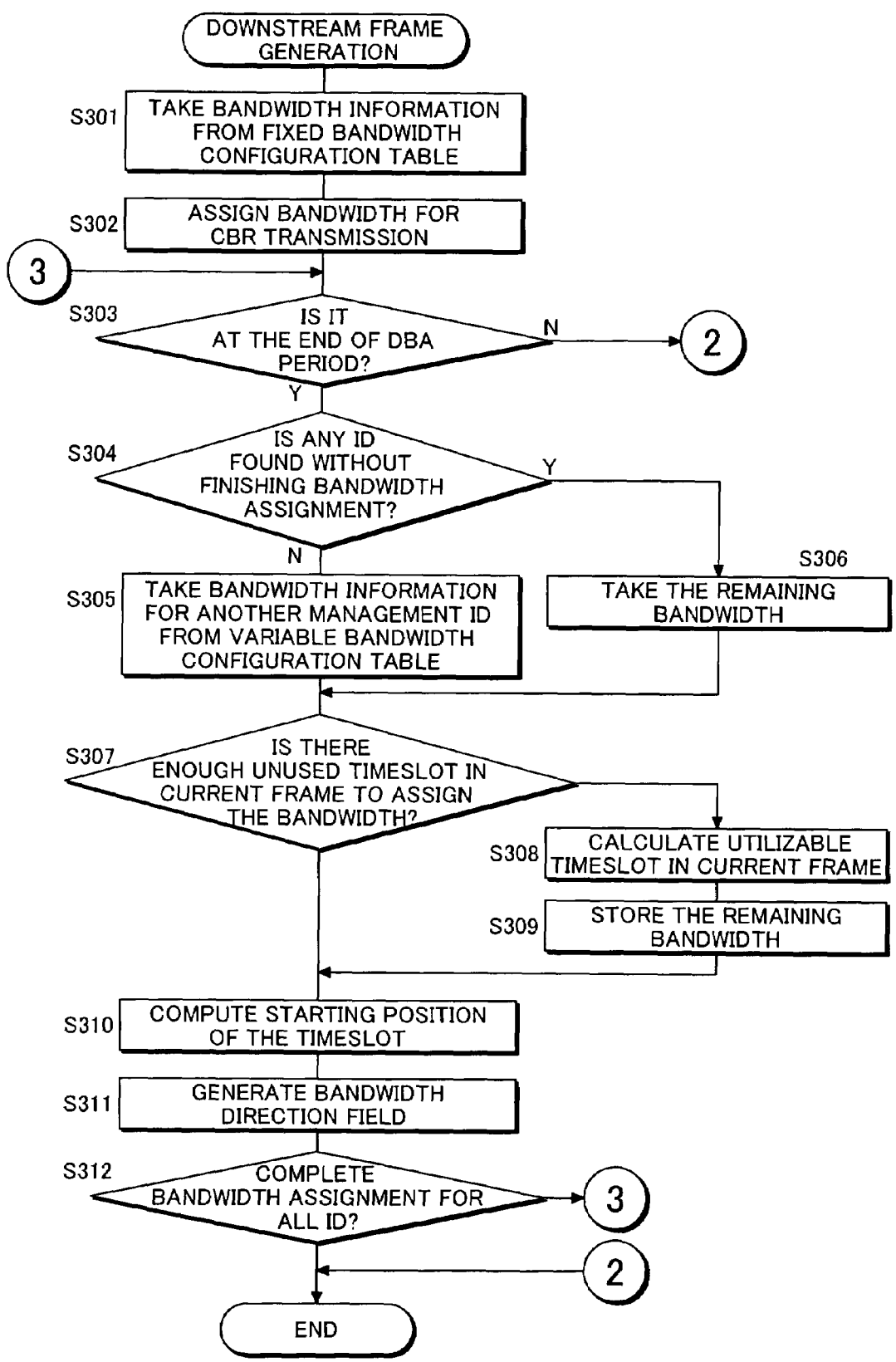
FIG. 7 is a flow chart for a process of assigning bandwidth permission information to an upstream frame according to the embodiment of this invention.

FIG. 5 to FIG. 7 are flow charts illustrating bandwidth assignment processing according to this invention.

FIG. 5 is a flow chart for an upstream frame reception process according to the embodiment of this invention. This process is executed in the OLT 1. The flow chart of FIG. 5 shows process steps of when the OLT 1 receives a frame containing upstream transmission waiting data amount information of the ONU 2 in order to illustrate a series of processes relating to bandwidth control.

In the PON termination unit 230 of the OLT 1, the upstream frame analysis unit 231 detects timing at which an upstream frame is received (S 101). The detected frame reception timing is used to adjust the EqD 421. A data transmission amount and data transmission start timing, which are specified by the OLT 1 for each ONU 2, are kept in the variable bandwidth configuration table 265 inside the OLT 1, and whether or not the kept data matches those of the received frame is checked (S102).

In the case where the planned transmission timing of the ONU 2 does not match the actual position where the upstream frame is received (when the difference between the two exceeds a certain threshold), the EqD 421 is set to a new value to correct the transmission timing of this ONU 2 (S103). In the case where the transmission position is correct (when the difference between the planned transmission timing of the ONU 2 and the actual reception position is equal to or smaller than the certain threshold), and in the case where header analysis of this frame is possible after the position correction in step S104, the amount of data accumulated in a queue of the ONU 2 while waiting to be transmitted is extracted from a header of this frame (S 105). The extracted amount of data yet to be transmitted is stored, along with an associated bandwidth management ID (Alloc-ID), in the bandwidth request information 263 (S106).

FIG. 6 is a flow chart showing a process of setting the variable bandwidth configuration table 265 according to this invention. The setting process is executed by the bandwidth calculation unit 262 of the OLT 1 in each variable bandwidth assignment cycle (variable bandwidth configuration table update cycle). As mentioned above, the variable bandwidth assignment cycle may be the cycle of one upstream frame or the cycle of multi-frame constituted of plural upstream frames.

The bandwidth calculation unit 262 first consults the fixed bandwidth configuration table 264 (S201) to obtain a fixed bandwidth assignment state in an upstream frame for which a variable bandwidth is to be set (S202). As described, in order to obtain the total bandwidth amount available for variable bandwidth communications within an upstream frame transmission cycle to be controlled when the cycle of updating the fixed bandwidth configuration table differs from the cycle of updating the variable bandwidth configuration table, a fixed bandwidth assignment state is obtained for every upstream frame that is included in this cycle. Next, the bandwidth calculating unit 262 extracts newly received information on a transmission queue of the ONU 2 from the bandwidth request information 263 (S203).

The bandwidth request information 263 includes bandwidth request information for each Alloc-ID, which is the unit of assigning a bandwidth to the ONU 2. Based on the fixed bandwidth state obtained, the bandwidth calculation unit 262 calculates on an Alloc-ID basis a bandwidth in which transmission is permitted until the next update of the variable bandwidth configuration table (S204). The calculated variable bandwidth amount to be assigned is written in the variable bandwidth configuration table (S205). The bandwidth calculation unit 232 may calculate in step S204 an assigned variable bandwidth amount for each bandwidth management ID such that a control policy set to each Alloc-ID is reflected in addition to the bandwidth request information. A control policy can be for treating variable bandwidth management IDs equally or for unequal bandwidth assignment according to priority levels that are set to the respective bandwidth management IDs.

FIG. 7 is a flow chart for a process of assigning bandwidth permission information to an upstream frame according to the embodiment of this invention. Bandwidth assignment is performed in basic cycles (125-microsecond frames) as illustrated in the sequence diagram of FIG. 4.

In the PON termination unit 230 of the OLT 1, the downstream frame generation unit 232 reads the fixed bandwidth configuration table 264 stored in the memory 260. The fixed bandwidth configuration table 264 holds an assigned bandwidth size and a starting position of a time slot for each Alloc-ID. The downstream frame generation unit 232 first sets a fixed bandwidth transmission position according to the read bandwidth transmission amount and transmission timing (pointer). Specifically, information on the fixed bandwidth transmission position is written in the bandwidth notification field of a downstream frame.

The downstream frame generation unit 232 next judges whether or not the DBA cycle (variable bandwidth configuration table update cycle) is continuous from the process of assigning a bandwidth to the preceding upstream frame (S303). In the case where the same DBA cycle as the preceding frame is still running, the DBA cycle differs from the fixed bandwidth assignment cycle. This can cause a situation in which, in assigning a large bandwidth or the like, bandwidth assignment for a specific entry in the table is continued from assignment to the preceding frame. Whether a border point between one DBA cycle and the next DBA cycle has been reached or not has to be checked here in order to assign a bandwidth appropriately. In the case where the DBA cycle has ended, in other words, when there is no Alloc-ID left to which a bandwidth is not assigned within the DBA cycle in question, the process is ended immediately.

Whether or not there is a bandwidth assigned to two frames as described above is checked next (S304). This can be judged from an assignment state flag defined in the variable bandwidth configuration table, or by using a register in which an Alloc-ID entry for which bandwidth assignment is not finished is recorded temporarily. In the case where there is an entry for which bandwidth assignment is not finished, the remaining bandwidth of the entry is read out of the variable bandwidth configuration table 265 or the register (S306). In the case where there is no entry for which bandwidth assignment is not finished, a new entry is read for which bandwidth assignment is not finished (S305).

Then it is judged whether or not the read bandwidth size is smaller than the remaining free area in this upstream frame (whether or not the entire bandwidth size can be assigned to the upstream frame) (S307). When the read bandwidth cannot be assigned as a whole, a size that can be assigned to this frame is extracted (S308), and the remainder is recorded in the table or in the register of entries that have not finished bandwidth assignment (S309).

When the entire bandwidth can be assigned, or after a bandwidth dividing process is finished, a time slot starting position is calculated from the free bandwidth state of the upstream frame (S310), and the bandwidth is assigned (S311). The variable bandwidth assignment process is similar to the fixed bandwidth assignment process described above in that a bandwidth specifying description is added in the bandwidth designating field of a downstream frame by a combination of a time slot starting position and a transmission data amount, or by a combination of a time slot starting position and a time slot ending position.

Lastly, whether bandwidth assignment has been completed for every entry in the variable bandwidth configuration table or not is checked (S312). When an entry for which bandwidth assignment is not finished is found in the same DBA cycle, processing of step S303 and subsequent steps is repeated. In the case where all of the assignment process has been finished by the time step S312 is executed, the variable bandwidth assignment process in this DBA cycle is ended.

FIG. 8A and FIG. 8B are explanatory diagrams of the fixed bandwidth configuration table 264 according to the hierarchized bandwidth control method of this invention.

Based on the fixed bandwidth configuration table 264, fixed bandwidth data is assigned such that the same amount of data is assigned at the same position in every frame. The fixed bandwidth configuration table 264 therefore reflects settings of communication channels used in synchronous multiplexing communications over E1 or T1 lines connected to the TDM line termination units of the PON system. Usually, the fixed bandwidth configuration table 264 is semi-fixed. The fixed bandwidth configuration table 264 can take two different forms shown in FIG. 8A and FIG. 8B, depending on the combination of information it holds.

A fixed bandwidth configuration table shown in FIG. 8A holds a position where fixed bandwidth data is assigned that is determined by an assigned bandwidth amount and a time slot starting position. This table contains a bandwidth management ID (Alloc-ID) 801, a bandwidth 802 and a time slot starting position 803. The bandwidth management ID (Alloc-ID) 801 is the basic unit of bandwidth control in a PON section, and can be associated with a service ID and a user ID. Characteristics of fixed bandwidth communications are such that the count of channels between the OLT 1 and the ONU 2 is semi-fixed and bandwidth control for each channel is not necessary. Accordingly, it is also possible to employ a method in which one Alloc ID associated with TDM data is set to each ONU 2 and a fixed communication bandwidth corresponding to the total count of channels of each ONU 2 is assigned.

The bandwidth 802 is a bandwidth assigned to data identified by the Alloc-ID, and indicates the amount of data of which transmission is permitted within a slot sandwiched between a time slot starting position and a bandwidth ending position, which will be described later. The time slot starting position 803 indicates a position in an upstream cycle frame at which assignment of data identified by the bandwidth management ID is started, and is expressed, in this embodiment, in bytes counted from a payload starting position of the upstream frame. The time slot starting position 803 and the bandwidth 802 determine transmission timing in the upstream frame of the data identified by the bandwidth management ID. Fixed bandwidth data needs to be fixed also in terms of transmission timing within each frame transmission cycle. By setting the time slot starting position 803 fixedly in the fixed bandwidth configuration table 264, for example, processing load in setting a bandwidth can be lessened.

FIG. 8B is another example of the fixed bandwidth configuration table 264.

In the fixed bandwidth configuration table 264 of FIG. 8B, the time slot starting position 803 and a bandwidth ending position 804 determine a position where fixed bandwidth data is assigned. The bandwidth ending position 804 indicates a position in an upstream cycle frame at which assignment of data identified by the bandwidth management ID is ended, and is expressed, in this embodiment, in bytes counted from the starting position of the upstream frame. The time slot starting position 803 and the bandwidth ending position 804 determine a transmissible bandwidth (data amount) assigned to the Alloc-ID.

FIG. 9 shows an example of the variable bandwidth configuration table 265.

Variable bandwidth data is assigned to an area that remains free after fixed bandwidth data is assigned. The assigned variable bandwidth data size is changed each time a new DBA cycle (variable bandwidth configuration table update cycle) is started. When plural Alloc-IDs are assigned variable bandwidths in succession, the transmission position, in addition to the assigned data size, is changed such that a transmission position for a bandwidth that is assigned first differs from a transmission position for a bandwidth that is assigned next. In some cases, the transmission-permitted size is also varied.

Therefore, to set information on variable bandwidth starting/ending positions in the variable bandwidth configuration table 265 in advance, what fixed bandwidth assignment positions are to be entered in the fixed bandwidth configuration table 264 has to be figured out at the same time the bandwidth calculation unit 262 calculates an assigned bandwidth by consulting the bandwidth request information 263. The assigned bandwidth amount alone is set in the variable bandwidth configuration table 265 in order to lighten the load of DBA processing and to separate the function of the bandwidth calculation unit 262 from the function of the downstream frame generation unit 231 for efficient processing. As the downstream frame generation unit 231 creates a bandwidth designating field, bandwidth assignment position is calculated by the pointer calculation unit 261 from the bandwidth assignment state up to that point and from a transmission-permitted bandwidth set in the variable bandwidth configuration table 265.

The variable bandwidth configuration table 265 contains a bandwidth management ID (Alloc-ID) 901 and a bandwidth 902. A flag 903 may also be contained in the table 265. The bandwidth 902 indicates a size that is allocated to a bandwidth controlled through the Alloc-ID. The bandwidth calculation unit 262 calculates the bandwidth 902 based on the bandwidth request information 263. Depending on the amount of bandwidth transmissible with the entire upstream frame as a DBA subject and the queue status that the bandwidth request information 263 indicates, not all of data waiting to be transmitted can be assigned a transmissible bandwidth.

The amount of data waiting to be transmitted upstream which is notified by the ONU 2 does not always need to be notified for each individual Alloc-ID. Instead, of Alloc-IDs associated with variable bandwidth data, as many IDs necessary for a minimum bandwidth guarantee may be received and stored at once. Accordingly, in assigning a bandwidth to each Alloc-ID, plural conditions have to be checked to divide a bandwidth transmissible with an upstream frame. In this invention, though details of the algorithm will be omitted, a unit of collecting queue information, a unit of assigning a bandwidth, and information on mapping of a bandwidth to an upstream frame have to be associated with one another inside the device.

The variable bandwidth configuration table defines a total amount of data to be transmitted within a DBA cycle in question. In the case where bandwidth assignment for one basic cycle frame extends over to the next basis cycle frame, in other words, when a bandwidth to be assigned is larger than a size containable in one frame, an external register for recording the amount of bandwidth that remains unassigned and a flag entered in a table field 903 to indicate whether transmission has been completed or not are used.

FIG. 10 shows another example of the variable bandwidth configuration table 265. The variable bandwidth configuration table 265 shown in FIG. 10 contains an Alloc-ID 901, a bandwidth 902, unassigned bandwidth 1001 and a maximum assigned bandwidth 1002.

The unassigned bandwidth 1001 indicates how much of a bandwidth to be transmitted within a DBA cycle in a flow controlled through an Alloc-ID in question remains unassigned. The field of the unassigned bandwidth 1001 is used when a large variable bandwidth is to be assigned to one basic cycle frame and its subsequent basic cycle frame. The field of the unassigned bandwidth 1001 is used also when a bandwidth transmissible with an upstream frame has all been spent in bandwidth assignment for Alloc-IDs preceding an Alloc-ID in question, and a part of bandwidth assignment for this Alloc-ID extends over to the next basic cycle frame. This is a method of recording an unassigned bandwidth in the variable bandwidth configuration table 265 when bandwidth assignment for one frame extends over to another frame as described above with reference to FIG. 9.

A maximum bandwidth that can be assigned to an Alloc-ID in each basic cycle frame may be specified as the maximum assigned bandwidth 1002. The variable bandwidth configuration table 265 of FIG. 10 shows how much of the bandwidth 902 in a DBA cycle in question which is specified for each Alloc-ID is yet to be assigned after the end of the DBA cycle is reached. In other words, the table 265 of FIG. 10 shows how much of data to be transmitted using the Alloc-ID is assigned to the subsequent frames.

FIG. 11 is an explanatory diagram of the bandwidth request information 263.

The bandwidth request information 263 is created when a packet accumulation state is received from the ONU 2. The bandwidth request information 263 is consulted by the bandwidth calculation unit 262 in determining time slots (bandwidth assignment timing and size for each Alloc-ID) to be allocated to an upstream frame in the next cycle.

The bandwidth request information 263 contains a bandwidth management ID (Alloc-ID) 1101 and a stored data amount 1102.

The bandwidth management ID 1101 indicates an identifier for identifying a service or a user, and serves as the unit of bandwidth control in a PON section. This embodiment employs allocation ID (Alloc-ID) as the bandwidth management ID 1101. An Alloc-ID is set in association with an ONU number and/or a queue number. Accordingly, instead of Alloc-ID, ONU number or queue number may be employed as the bandwidth management ID 1101. Alternatively, an entry may be made for a bandwidth management ID (bandwidth management unit) that is obtained by converting an Alloc-ID contained in a received frame into another identifier (ONU number or queue number). The stored data amount 1102 indicates the amount of data accumulated in a transmission queue in the ONU 2 which is managed through the bandwidth management ID 1101 while waiting to be transmitted.

The bandwidth request information 263 may additionally contain a bandwidth control technique 1103, which indicates whether data associated with each Alloc-ID is fixed bandwidth communication data or variable bandwidth communication data. In practice, there is no need to manage a queue status dynamically for fixed bandwidth communication data because which channel is to be used for fixed bandwidth communication data in a PON section is determined from static settings by the OpS.

However, for some Alloc-IDs, bandwidth may be controlled by combining a bandwidth amount fixedly assigned in order to set a minimum guaranteed bandwidth and a best-effort bandwidth assigned for improvement of the transmission efficiency when a free bandwidth is available. Then, by consulting this parameter, to which Alloc-ID a bandwidth is to be assigned fixedly and preferentially can be known as well as the amount of bandwidth to be assigned to the Alloc-ID, which makes detailed bandwidth control possible.

A bandwidth assignment priority flag which is consulted in bandwidth calculation may be set to each entry. The bandwidth assignment priority flag is an example of a parameter contained in the bandwidth request information 263 as other parameter 1104, and is used when it is necessary to set priority levels to variable bandwidth communication data pieces, or when it is necessary to set priority levels to fixed bandwidth communication data pieces for the above-described assignment of a guaranteed bandwidth. Which priority level is to be set may be determined by the type of communication traffic (i.e., service or application), or by contracts made with users. In this case, a bandwidth assignment priority flag is set in advance according to a user's contract or the like.

Figure 12:
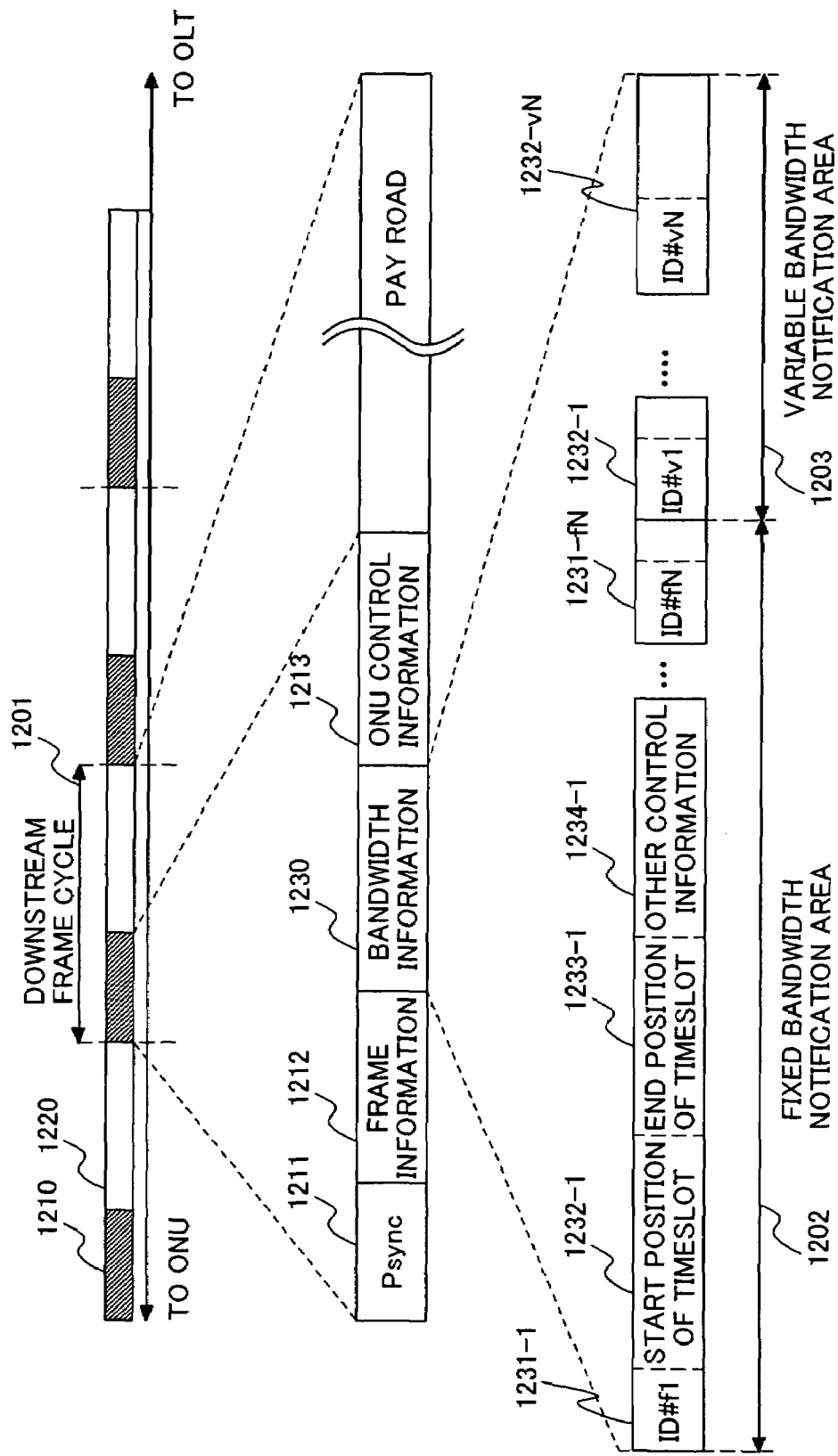
FIG. 12 is an explanatory diagram showing a configuration of a downstream frame according to the embodiment of this invention.

FIG. 12 shows the configuration of a downstream frame sent from the OLT 1 to the ONU 2 to deliver information on bandwidth assignment to an upstream frame. The OLT 1 is to the right of the drawing and the ONU 2 is to the left of the drawing.

Downstream frames are periodically transmitted through communications using TDMA, and the cycle of downstream frame transmission is a basic frame cycle (125 microseconds, for example) 1201. Accordingly, a downstream frame header portion 1210 and a payload portion 1220 in the topmost part of FIG. 12 are repeatedly observed traveling toward the ONU 2.

The header portion 1210 contains a Psync field 1211, a frame information field 1212, a bandwidth information field 1230 and an ONU control information field 1213. The Psync field 1211 stores a specific signal pattern for frame synchronization on the receiver side (i.e., the ONU 2). The bandwidth information field 1230 stores information for notifying each ONU 2 of information on bandwidth assignment to an upstream frame. The ONU control information field 1213 stores information for notifying control information about activation, shutdown, and the like of each ONU 2. The frame information field 1212 contains, as frame information consulted by the receiver, whether to perform FEC processing on a frame in question, a frame counter, BIP, and a header length. The frame information field 1212 and the ONU control information field 1213 may be rewritten or deleted if necessary.

The bandwidth information field 1230 contains bandwidth management IDs (Alloc-IDs) 1231-1 to 1231-$f$N, time slot starting positions 1232-1 to 1232-$f$N, time slot ending positions 1233, and bandwidth control information fields 1234. The time slot starting positions 1232-1 to 1232-$f$N each indicate a position where transmission of a bandwidth assigned to an Alloc-ID in question is started. The bandwidth control information fields 1234 store, for the respective Alloc-IDs, information on whether a queue status notification command is necessary or not and information on whether or not FEC is to be employed in an upstream frame.

The bandwidth information field 1230 contains information on assignment of a bandwidth to every Alloc-ID that is permitted transmission at timing specified by the downstream frame. For instance, when the payload portion contains only data directed to a specific Alloc-ID (ONU2), the bandwidth control portion 1230 of the header 1210 contains, as in any other cases, bandwidth assignment information for every Alloc-ID that is permitted data transmission by means of the same upstream frame according to the DBA mechanism.

This embodiment describes a case in which bandwidth information is divided into a fixed communication bandwidth notification area 1202 and a variable data transmission bandwidth notification area 1203. However, the order of bandwidth notification for each Alloc-ID is not limited to this order. When a minimum bandwidth is guaranteed, in particular, a fixed bandwidth and a variable bandwidth may be mixed in a transmission bandwidth designation for each Alloc-ID. Telephone or other data that uses a fixed channel may be placed before the bandwidth information field 1230 since, in practice, it is convenient to process data in the order it arrives.

As mentioned in the description of the DBA basic sequence, for telephone or other data traffic that uses a fixed channel, it is not always necessary to update the fixed bandwidth configuration table 264 (or, in other words, assign the fixed bandwidth) each time new basic frame cycle 1201 is started, and the fixed bandwidth configuration table 264 may be updated in cycles with one cycle being an integral multiple of the basic frame cycle.

Figure 13:
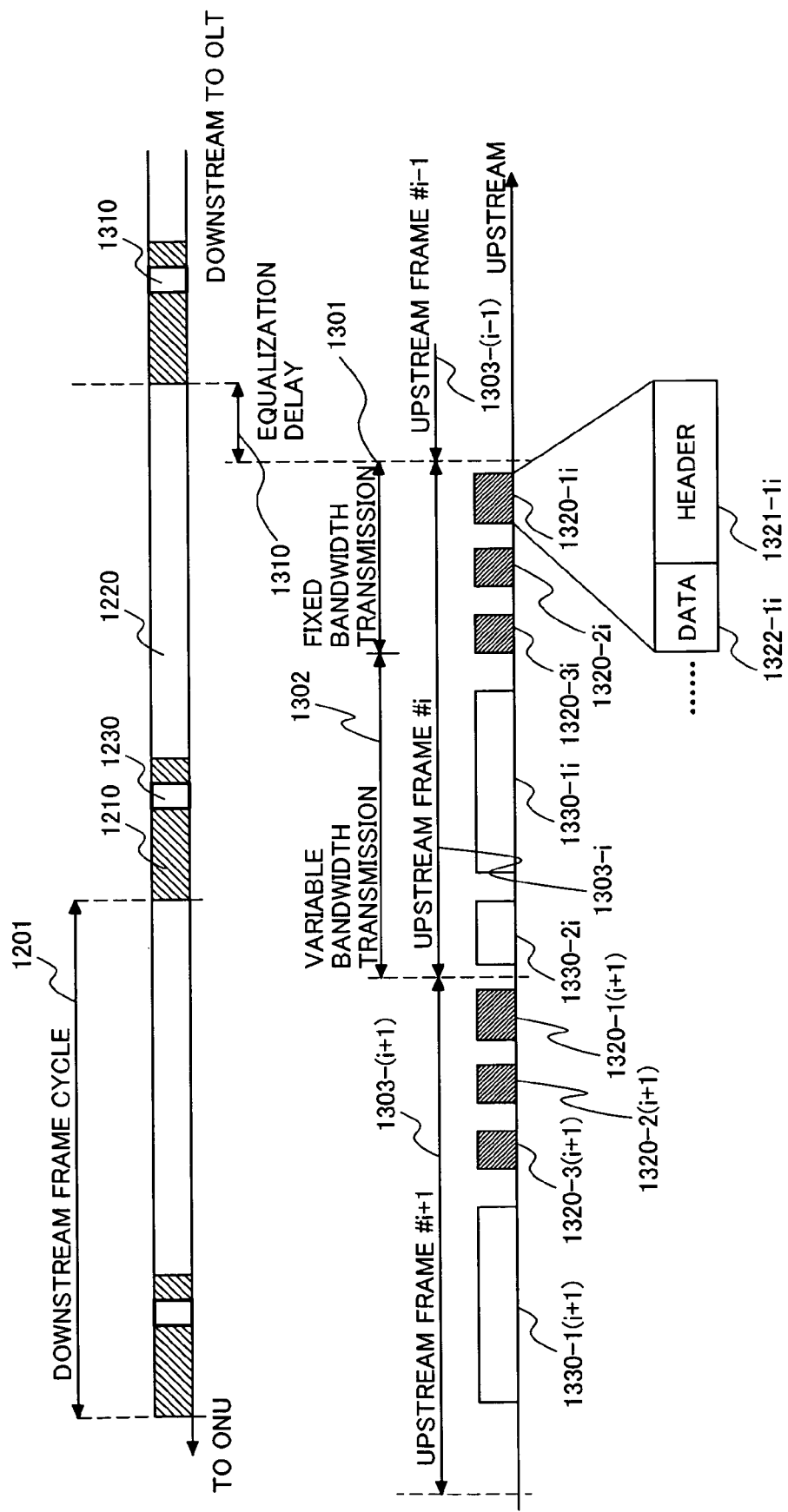
FIG. 13 is an explanatory diagram showing a data assignment state in an upstream frame according to the embodiment of this invention.

FIG. 13 shows a data assignment state in an upstream frame.

Shown in an upper part of FIG. 13 is a downstream frame in a PON section. The ONU 2 is to the left of the drawing and the OLT 1 is to the right of the drawing. The downstream frame has the header 1210, the payload 1220 and the basic frame cycle 1201, which are the same as in the downstream frame shown in FIG. 12. The header of the downstream frame in FIG. 13 contains the bandwidth control information field 1230 as does the downstream frame shown in FIG. 12.

Receiving the downstream frame, the ONU 2 sends data following a time slot command which uses a reference point past an Equalization Delay (EqD) 1310, a specific delay time set in advance, as described above with the DBA sequence diagram. A lower part of FIG. 13 shows an upstream frame transmission state. Here, transmission timing of individual frames is explained by showing how data is multiplexed in an upstream frame when the OLT 1 receives an upstream frame after data from plural ONUs 2 (Alloc-IDs) is multiplexed by splitters to explain respective frame transmission timings. In a frame #i 1303-$i$ of FIG. 13, frames sent from the ONUs 2 in response to the downstream frame that is first from right in the upper part of FIG. 13 are multiplexed.

An upstream frame contains fixed bandwidth data 1301 and variable bandwidth data 1302. In the case where an SDH network is contained, every frame contains the same amount of fixed bandwidth data at the same position unless the OpS changes settings of fixed bandwidth communication channels. In other words, the OLT 1 of this embodiment assigns to a large frame, which is composed of plural basis frames, the same amount of fixed bandwidth data at the same position that is relative to the head of the large frame. Therefore, the position of fixed bandwidth data does not vary from one frame to another, and fixed bandwidth data is transmitted in regular cycles.

Assignment of variable bandwidth data, on the other hand, may vary from one frame to another. This is because what variable bandwidth data is to be assigned is changed each time a new basic frame cycle is started as the traffic changes by the minute. The OLT 1 of this embodiment assigns variable bandwidth data at a position where fixed bandwidth data is not assigned.

An enlarged view of each upstream frame is shown in the lowermost part of FIG. 13. An upstream frame contains a header portion 1321 and a data portion 1322. The header portion 1321 contains identification information with which traffic (a flow) carried by the frame is identified. The data portion 1322 carries data that is actually delivered. Data and a header are provided for each bandwidth management ID. In some cases, plural flow identifiers may be associated with each Alloc-ID. Then plural individual frames are included in a bandwidth assigned to one Alloc-ID.

A bandwidth fixed data area, which in FIG. 13 is placed on the head side of a frame, does not always need to be positioned on the head side of a frame. In addition, while a frame in FIG. 13 has one bandwidth fixed data area and one bandwidth variable data area, there may be plural bandwidth fixed data areas and plural bandwidth variable data areas in one frame.

Figure 14:
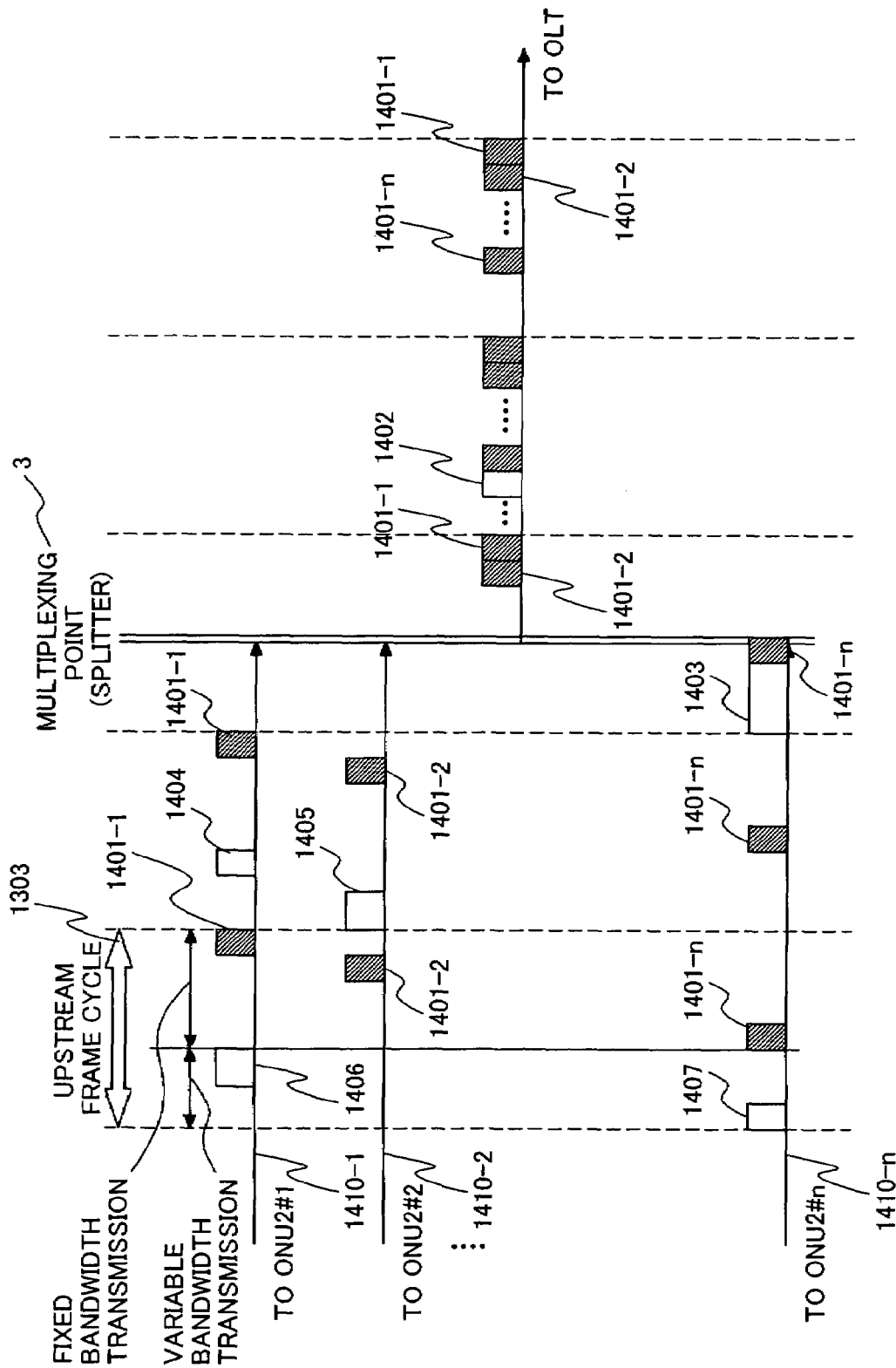
FIG. 14 is an explanatory diagram of a frame multiplexing method employed in transmission of an upstream frame according to the embodiment of this invention.

FIG. 14 is a diagram illustrating a method of multiplexing frames over an optical fiber when upstream frames are transmitted from the ONU 2 to the OLT 1. In FIG. 14, frames are transmitted from left to right toward the OLT 1, and data on the right hand side of FIG. 14 is one that has been sent earliest. In an example shown in FIG. 14, frames are arranged such that a frame that is sent out of the ONU 2 later than another frame is placed to the left of the other frame. A basic cycle frame (125 microseconds, for example) is indicated by a pair of dotted lines in the drawing.

Frames sent from the ONU 2 pass through the splitter 3 to be multiplexed into one fiber 1401-1 to 1401-*n* in FIG. 14 indicate transmission positions and sizes of fixed bandwidth communication data sent from the ONU 2#1 to ONU 2#*n*, respectively. The data 1401-1 to data 1401-*n* which have been distributed among plural fibers before passing through the splitter 3 are multiplexed after passing through the splitter. A frame 1402 to a frame 1407 indicate variable bandwidth data sent from the ONUs 2#1 to 2#*n*. Variable bandwidth data is inserted by the DBA mechanism in a manner that avoids overlapping with fixed bandwidth data upon multiplexing.

Figure 15:
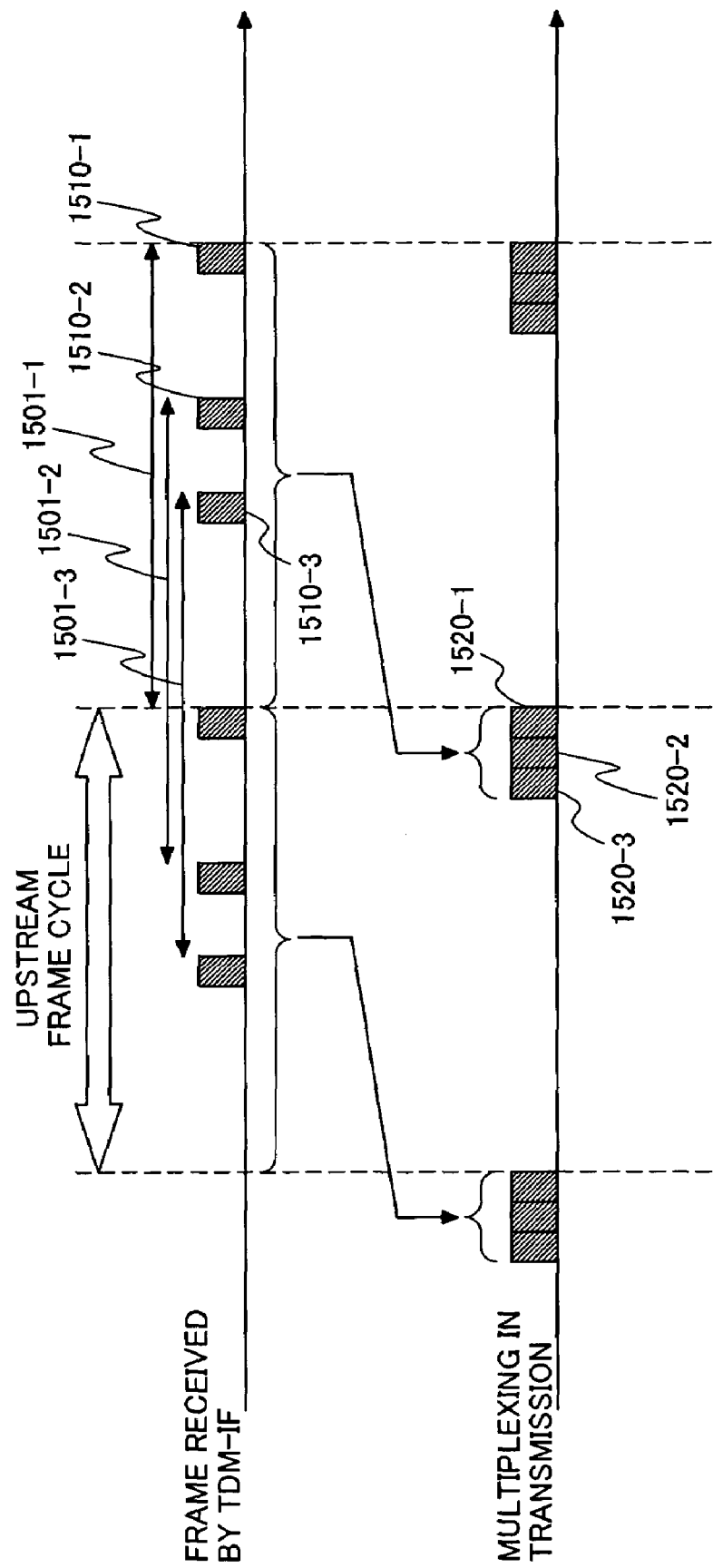
FIG. 15 is an explanatory diagram of fixed bandwidth communication data generation timing employed when TDM data is sent to a PON section through a fixed communication channel according to the embodiment of this invention.

FIG. 15 shows fixed bandwidth communication data generation timing in the ONU 2. More specifically, FIG. 15 shows fixed bandwidth communication data generation timing of when TDM data received by a TDM-IF is sent to a PON section through a fixed communication channel. While the cycle of assigning a bandwidth for fixed bandwidth communications (namely, the fixed bandwidth configuration table update cycle) is employed as a basic frame cycle in FIG. 15, the same principle applies when an integral multiple of the basic frame cycle is employed, only that the sampling cycle in this case is shorter.

As shown in FIG. 15, data sent via one fixed bandwidth communication channel and data sent via another fixed bandwidth communication channel are received by the TDM-IF at different reception timing, though data reception cycles 1501-1 to 1501-3 have the same, length.

The ONU 2 temporarily stores in a buffer an amount of data to be transmitted within one cycle of the upstream frame transmission cycle. The ONU 2 then sends the stored data in an upstream frame at intervals of a fixed bandwidth configuration table update cycle. Specifically, the data reception cycles 1510-1, 1510-2, and 1510-3 are changed to 1520-1, 1520-2, and 1520-3, respectively, for transmission of the stored data with a different timing. Similar processing is performed in the OLT 1 when TDM data received from the SNI side is sent in a downstream frame to a PON section.

A description will be given with reference to FIGS. 16 to 19C on changes observed in queue status when this invention is applied. A system in this case is operated according to the sequence shown in FIG. 4.

Figure 16:
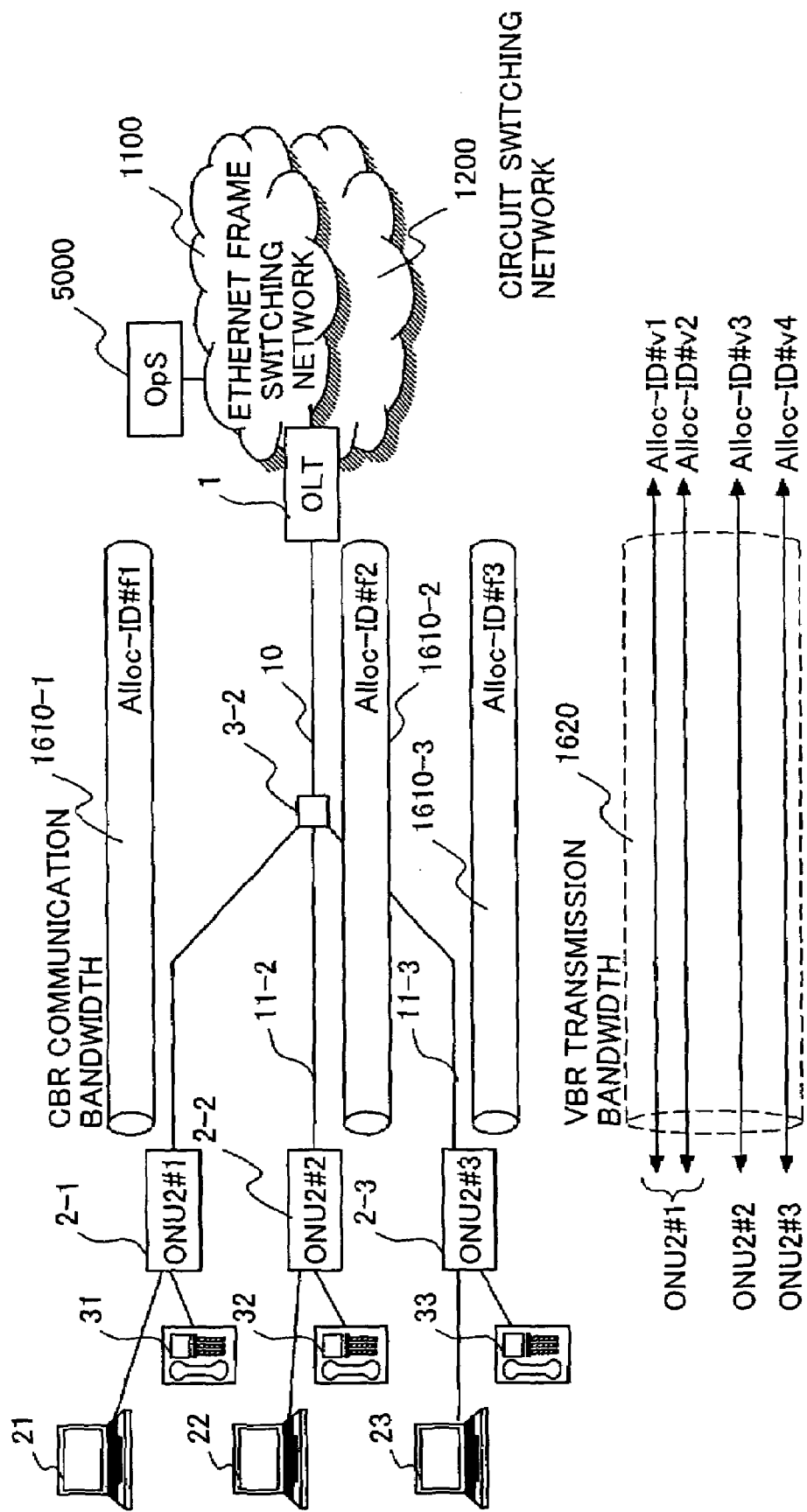
FIG. 16 is an explanatory diagram of a connection relation between the OLT and the ONU according to the embodiment of this invention.

In FIG. 16, plural ONUs 2 (#1 to #3) are connected to the OLT 1. Terminal devices 21 to 23 and telephone sets 31 to 33 are connected to the ONUs 2#1 to 2#3, respectively. The OLT 1 is connected on the SNI side to an Ethernet network 1100, which is for data communications, and a TDM network 1200, which contains a telephone network.

An OpS 5000 is connected as a PON section control management terminal to the OLT 1 via the Ethernet network or the TDM network. The OpS 5000 may be connected directly to the OLT 1. FIG. 16 schematically shows settings of a communication session for upstream communications.

Fixed bandwidth communication sessions 1610-1 to 1610-3 are extended from the OLT 1 to the ONUs 2#1 to 2#3, respectively. The fixed bandwidth communication sessions 1610-1 to 1610-3 are identified in a PON section with bandwidth management IDs, Alloc-ID #f1 to Alloc-ID #f3, respectively. A part of an upstream bandwidth of an optical fiber 10 that is not used for fixed bandwidth communications is controlled by DBA, and put into use dynamically as the need arises.

FIG. 16 deals with a case where the ONU 2#1 is given two bandwidth management IDs for variable bandwidth, Alloc-IDs #v1 and #v2, and a bandwidth management ID for fixed bandwidth, three IDs in total, with which data is transferred, the ONU 2#2 is given one bandwidth management ID for variable bandwidth, Alloc-ID #v3, and one bandwidth management ID for fixed bandwidth, two IDs in total, with which data is transferred, and the ONU 2#3 is given one bandwidth management ID for variable bandwidth, Alloc-ID #v4, and one bandwidth management ID for fixed bandwidth, Alloc-ID #f3, two IDs in total, with which data is transferred.

Alloc-ID is ID for bandwidth management and, in practice, plural session IDs can be associated with each Alloc-ID. Described here is a case in which one session is associated with each Alloc-ID for simplification. Session ID is the smallest unit of bandwidth control in a PON section, and is usually associated with bandwidth control queue (transmission queue) for bandwidth control. Combining a bandwidth method of this invention in which bandwidth is controlled by associating session ID with queue and one step finer QoS control makes it possible to fully utilize bandwidth in a PON section where bandwidth is shared.

Several types of transmission queue having different control functions are employable. For instance, fixed bandwidth queue is used to perform top priority processing for fixed bandwidth communications and keep the rate constant. Certain bandwidth guarantee queue keeps the average communication rate constant for one period of time. Minimum bandwidth guarantee queue ensures a minimum bandwidth, and treats a flow exceeding the minimum bandwidth as best-effort transmission. Maximum bandwidth limit queue is contrary to minimum bandwidth guarantee queue, and filters such that an upper limit rate set in advance is not exceeded. Complex queue is a combination of the above queues, and stores a rate equal to or larger than a minimum bandwidth and equal to or smaller than a maximum bandwidth.

Best-effort queue which uses priority control alone is also employable. Theoretically, more complicated DBA control is achieved if these different types of queue respectively sort out queue statuses and notify the OLT 1 of the queue statuses. However, the purpose here is to show a fixed bandwidth/variable bandwidth control method that follows the basic sequence, and the following description assumes that, basically, best-effort queue alone is used for variable bandwidth.

As an example, in the configuration of FIG. 16, each Alloc-ID is associated with one fixed rate queue for fixed bandwidth and one best-effort queue for variable bandwidth.

FIG. 17A shows an example of a queue status management table provided in the ONU 2 to manage the status of a queue for sending frames upstream. FIG. 17A depicts a general case rather than reflecting the configuration of FIG. 16. To modify FIG. 17A so that the configuration of FIG. 16 is reflected, one Alloc-ID for fixed bandwidth and one or two Alloc-IDs for variable bandwidth are prepared.

This embodiment includes a case in which plural queues are assigned to one Alloc-ID, and therefore a bandwidth management ID 1701 is associated with a queue ID 1702. In the case where Alloc-ID-queue ID association is on a one-on-one basis, either the column of the bandwidth management ID 1701 or the column of the queue ID 1702 is unnecessary. A stored data amount 1703 indicating the amount of data (frames) accumulated in a queue, and a queue control technique 1702 are set to each queue ID 1702. When the device configuration makes it difficult to dynamically set a queue control technique, the queue ID 1702 may be associated with the control technique 1704 fixedly. In this case, the column of the control technique 1704 is unnecessary. The queue status management table may additionally contain a notification priority level set as a parameter for each queue. Since the OLT 1 assigns a bandwidth according to a notification sent from the ONU 2, setting a control parameter that is concerned to the operation of the ONU 2 in the ONU 2 makes it possible to cover operations that cannot be taken care of by the OLT 1.

FIGS. 17B to 17D show queue statuses in the ONU 2#1 to ONU 2#3 prior to queue status notification.

As the queue status notification command 401 is received from the OLT 1, queue statuses shown in FIGS. 17B to 17D are sent in the upstream frame #i 402 shown in FIG. 4 to the OLT 1. The OLT 1 stores the received information in the bandwidth request information 263 and calculates a bandwidth based on the stored information. Here, the sequence of FIG. 4 is followed and accordingly a case of assigning a fixed bandwidth at intervals of one basic frame cycle (125 microseconds) is described. FIGS. 18A and 18B show data written in the fixed bandwidth configuration table 264 and the variable bandwidth configuration table 265 after calculation of an assigned bandwidth size.

DBA is a function for variable bandwidth, and the OLT 1 is not notified of the status of a transmission queue that is associated with a bandwidth management ID for fixed bandwidth. The fixed bandwidth configuration table 264 shown in FIG. 18A is updated, as described above, only when the OpS has changed settings of fixed bandwidth communication channels. In normal operation, the fixed bandwidth configuration table 264 is consulted in creating a bandwidth information field in a downstream frame. On the other hand, the variable bandwidth configuration table 265 is updated when a border point between a variable bandwidth configuration table update cycle (the cycle of bandwidth assignment by DBA) and the next cycle is reached. Based on received queue statuses and priority levels of Alloc-ID #v1 to Alloc-ID #v4, available bandwidths in an upstream frame within a DBA cycle are assigned to the Alloc-IDs #v1 to #v4.

A fixed communication bandwidth assigned based on the fixed bandwidth configuration table 264 of FIG. 18A is sent in the downstream frame #i+1 of FIG. 4 to each ONU 2 (a fixed communication bandwidth is assigned to each Alloc-ID, to be exact). Assignment of a variable bandwidth based on a bandwidth request that is sent in the upstream frame #i is computed during the variable bandwidth configuration table update cycle 450 of FIG. 4. Computed bandwidths shown in FIGS. 18A and 18B are assigned starting from a downstream frame that follows the upstream frame #i+m and, by the time a border point between the current cycle and the next variable bandwidth assignment cycle is reached, a variable bandwidth is assigned after, if necessary, divided among plural basic frames. Accordingly, a variable bandwidth assigned by the downstream frame #i+1 is a value calculated during the last variable bandwidth configuration table update cycle.

FIGS. 19A to 19C show queue statuses in the ONUs 2 after variable bandwidth communication data is sent out according to the variable bandwidth configuration table shown in FIG. 18B. For each Alloc-ID, the size of data stored in a queue is expressed as L_vN+I_vN−BW vN (N=1 to 4) when data newly received by the UNI side interfaces of the ONUs 2 is given as I_v1 to Iv4.

Data of fixed bandwidth communications using TDM is not a subject of DBA processing, and is communicated always at a constant rate. Therefore, theoretically, there is no change in queue status during fixed bandwidth communications.

As has been described, a bandwidth control apparatus according to the embodiment of this invention controls bandwidths assigned to plural data transmission apparatuses in time-division multiplexing (TDM) communications. The bandwidth control apparatus dynamically changes a bandwidth assigned to each transmission apparatus according to the communication traffic utilization state (for example, the count of sessions, the count of channels, and the length of a transmission queue in a transmission apparatus).

For that reason, a fixed bandwidth configuration table and a variable bandwidth configuration table are prepared separately. Fixed bandwidth data assignment is put before variable bandwidth data assignment, and a constant bandwidth is assigned for transmission of a constant amount of fixed bandwidth data in regular cycles. Then variable bandwidth data is assigned to the remaining bandwidth. In this way, fixed bandwidth traffic in which fluctuation in delay time has to be prevented and variable bandwidth traffic (best-effort traffic) in which the margin for delay time is relatively large are handled simultaneously with efficiency. In addition, since the same amount of fixed bandwidth data arrives in the same length of time, jitters of fixed bandwidth data can be reduced. The jitters can further be reduced by assigning fixed bandwidth data always at the same point in time in a bandwidth assignment cycle.

While prior art controls fixed bandwidth data and variable bandwidth data mixedly, this invention separates dynamic bandwidth control for variable bandwidth data, which changes dynamically, from static bandwidth control for fixed bandwidth data, to thereby secure a bandwidth and transmission timing for fixed bandwidth data.

This invention assigns variable bandwidth data after fixed bandwidth data is assigned at a fixed position. Calculation for assignment of fixed bandwidth data is thus eliminated and less data assignment calculation is needed than in prior art where different types of traffic are handled mixedly.

While the present invention has been described in detail and pictorially in the accompanying drawings, the present invention is not limited to such detail but covers various obvious modifications and equivalent arrangements, which fall within the purview of the appended claims.

What is claimed is:

1. A transmission apparatus for exchanging data with plural optical network units via one or more communication lines, comprising:

a reception unit for receiving a first basic cycle frame, in which sub-frames are multiplexed, sent from each of the plural optical network units;

a memory unit for storing a program;

a processor for executing the program stored in the memory unit to process the received first basic cycle frame; and a transmission unit for sending a bandwidth amount of a second basic cycle frame to be transmitted after receiving the first basic cycle frame, to the plural optical network units, the bandwidth amount being calculated by the processor, wherein the second basic cycle frame includes fixed bandwidth data which is set with a fixed transmission position and a corresponding fixed transmission bandwidth for each of the plural optical network units, and variable bandwidth data which includes a variable-length packet which is not set with a fixed transmission bandwidth for each of the plural optical network units, wherein the fixed bandwidth data is received by a time division multiplexing interface of each of the plural optical network units, and a cycle of the fixed bandwidth data synchronizes with a cycle of the second basic cycle frame, and wherein the processor is configured to:

assign transmission positions for the fixed bandwidth data to each first frame unit which includes a first integral multiple number of the second basic cycle frame in order for the plural optical network units to transmit the fixed bandwidth data at a cycle of the integral multiple number of the second basic cycle frame;

assign transmission positions for the variable bandwidth data to a second frame unit which includes a second integral multiple number of the second basic cycle frame, after assigning the transmission positions for the fixed bandwidth data to said each first frame unit, by calculating a bandwidth assignment amount for the variable bandwidth data and then assigning each of the transmission positions at a timing where the fixed bandwidth data is not assigned thereat, the first integral multiple number being different from the second integral multiple number; and wherein, when a bandwidth assignment timing set based on the bandwidth amount of the variable bandwidth data is across a border between a first and a subsequent basic cycle frame, the memory unit is configured to store a size of an already assigned bandwidth in the first variable bandwidth data and a size of an unassigned bandwidth of the variable bandwidth data, and the processor is configured to assign a bandwidth in the subsequent variable bandwidth data as large as the unassigned bandwidth size.

2. The transmission apparatus according to claim 1, wherein the first integral multiple number is smaller than the second integral multiple number.

3. The transmission apparatus according to claim 1, wherein a cycle of the variable bandwidth data is the second integral multiple number of the cycle of the fixed bandwidth data.

* * * * *

UNITED STATES PATENT AND TRADEMARK OFFICE
CERTIFICATE OF CORRECTION

PATENT NO. : 7,620,325 B2　　　　　　　　　　　　　　　　　　　　　　　　Page 1 of 1
APPLICATION NO. : 11/340524
DATED : November 17, 2009
INVENTOR(S) : Mizutani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Twenty-sixth Day of October, 2010

David J. Kappos
*Director of the United States Patent and Trademark Office*